United States Patent
Yasui

(10) Patent No.: US 10,908,740 B2
(45) Date of Patent: *Feb. 2, 2021

(54) IRRADIATION OPTICAL SYSTEM AND PROJECTOR

(71) Applicant: Sony Corporation, Tokyo (JP)

(72) Inventor: Toshifumi Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,278

(22) Filed: Jul. 30, 2019

(65) Prior Publication Data

US 2019/0354234 A1 Nov. 21, 2019

Related U.S. Application Data

(63) Continuation of application No. 15/546,782, filed as application No. PCT/JP2015/084354 on Dec. 8, 2015, now Pat. No. 10,459,575.

(30) Foreign Application Priority Data

Feb. 5, 2015 (JP) .................................. 2015-021020

(51) Int. Cl.
*G06F 3/042* (2006.01)
*G03B 29/00* (2006.01)
(Continued)

(52) U.S. Cl.
CPC ............. *G06F 3/0423* (2013.01); *G02B 3/06* (2013.01); *G02B 27/0927* (2013.01);
(Continued)

(58) Field of Classification Search
CPC .... G06F 3/0423; G06F 3/0426; G06F 3/0421; G03B 21/26; G03B 29/00;
(Continued)

(56) References Cited

U.S. PATENT DOCUMENTS 7,050,048 B2    5/2006  Ito
8,270,084 B2 *  9/2012  Mikliaev ............ G02B 19/0095
                                                      359/618

(Continued)

FOREIGN PATENT DOCUMENTS

| CN | 102401982 A | 4/2012 |
| JP | H10-097002 A | 4/1998 |
| JP | 2001-282445 A | 10/2001 |

OTHER PUBLICATIONS

Japanese Office Action dated Feb. 18, 2020 in connection with Japanese Application No. 2016-573196, and English translation thereof.

(Continued)

*Primary Examiner* — William C. Dowling
(74) *Attorney, Agent, or Firm* — Wolf, Greenfield & Sacks, P.C.

(57) ABSTRACT

An irradiation optical system includes a uniformizing section and an irradiation lens section. The uniformizing section brings in-plane distribution of light emitted from a light source, close to uniform in-plane distribution. The irradiation lens section diffuses the light in a predetermined direction. The in-plane distribution of the light is brought close to the uniform in-plane distribution by the uniformizing section. The irradiation lens section includes, in order from the light source, a first cylindrical lens and a second cylindrical lens each having negative refractive power in the predetermined direction.

20 Claims, 15 Drawing Sheets

(51) Int. Cl.
  *G06F 3/03*    (2006.01)
  *G03B 17/54*   (2021.01)
  *G03B 21/26*   (2006.01)
  *G02B 27/09*   (2006.01)
  *G02B 3/06*    (2006.01)

(52) U.S. Cl.
  CPC ......... *G02B 27/0966* (2013.01); *G03B 17/54* (2013.01); *G03B 21/26* (2013.01); *G03B 29/00* (2013.01); *G06F 3/0304* (2013.01); *G06F 3/0421* (2013.01); *G06F 3/0426* (2013.01)

(58) Field of Classification Search
  CPC ............ G02B 27/0966; G02B 27/0927; G02B 27/0955; G02B 27/0926; G02B 27/0911
  See application file for complete search history.

(56) References Cited

U.S. PATENT DOCUMENTS

| | | | |
|---|---|---|---|
| 10,459,575 B2 | 10/2019 | Yasui | |
| 2001/0026268 A1 | 10/2001 | Ito | |
| 2003/0039036 A1* | 2/2003 | Kruschwitz | H04N 9/3161 |
| | | | 359/707 |
| 2009/0231718 A1* | 9/2009 | Muenz | B23K 26/0604 |
| | | | 359/626 |
| 2014/0139467 A1 | 5/2014 | Ghosh et al. | |
| 2014/0218341 A1 | 8/2014 | Ichieda | |
| 2014/0240293 A1 | 8/2014 | McCaughan et al. | |
| 2015/0204659 A1 | 7/2015 | Furukawa | |
| 2018/0011606 A1 | 1/2018 | Yasui | |

OTHER PUBLICATIONS

International Search Report and Written Opinion and English translation there of dated Jan. 26, 2016 in connection with International Application No. PCT/JP2015/084354.

International Preliminary Report on Patentability and English translation thereof dated Aug. 17, 2017 in connection with International Application No. PCT/JP2015/084354.

U.S. Appl. No. 15/546,782, filed Jul. 27, 2017, Yasui.

Chinese Office Action dated Nov. 1, 2019 in connection with Chinese Application No. 201580074881.4 and English translation thereof.

* cited by examiner

[ FIG. 1 ]
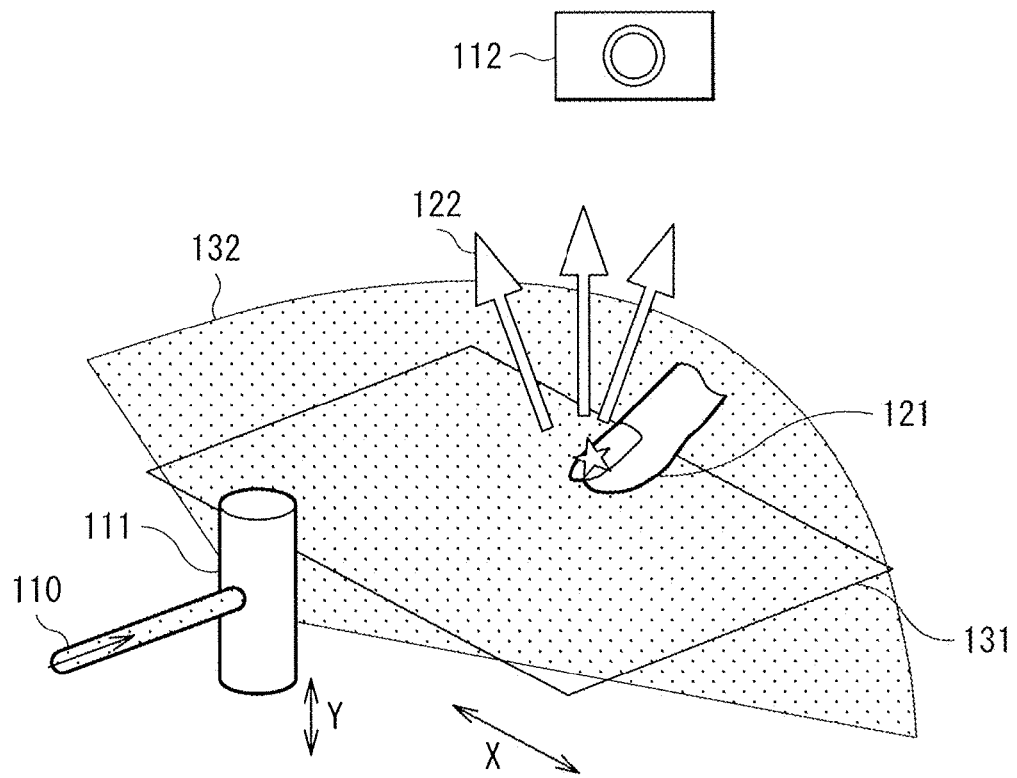
[ FIG. 2 ]
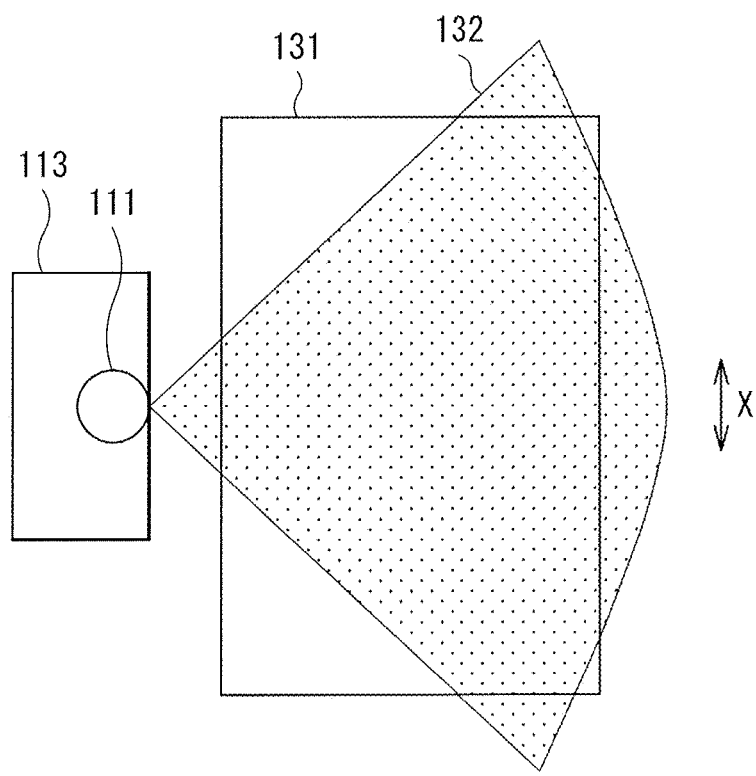

[ FIG. 3 ]
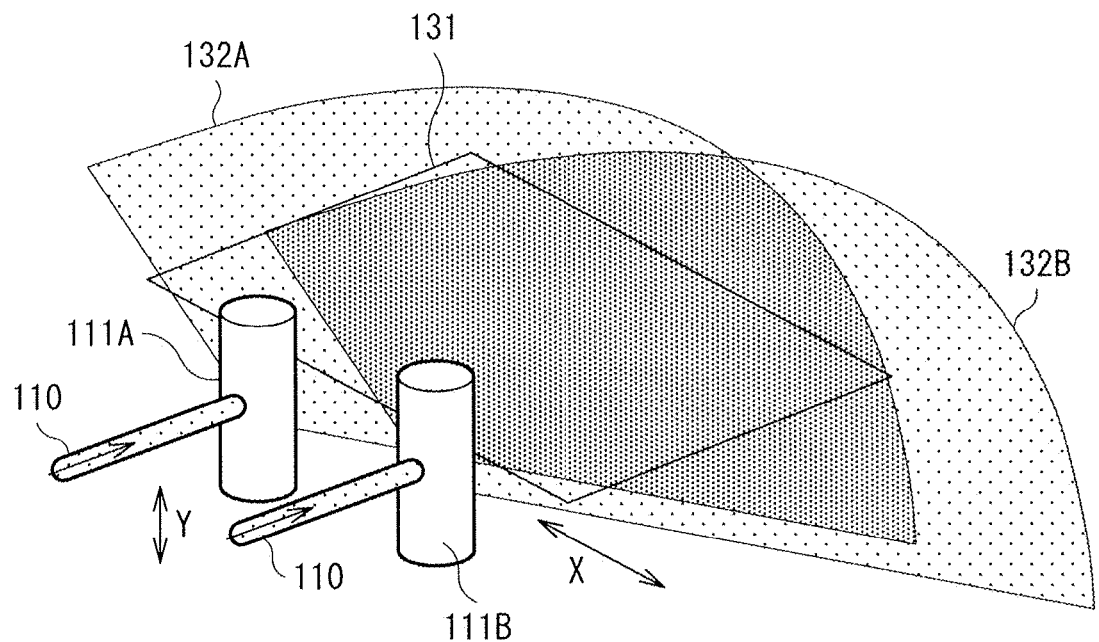
[ FIG. 4 ]
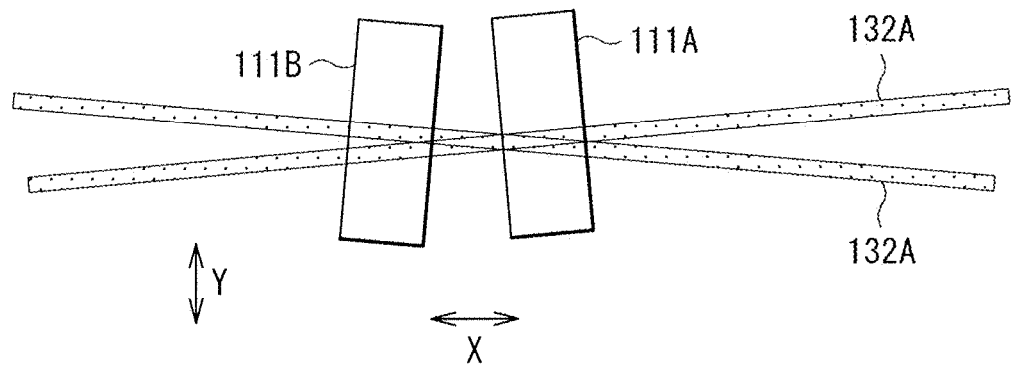

[ FIG. 5 ]
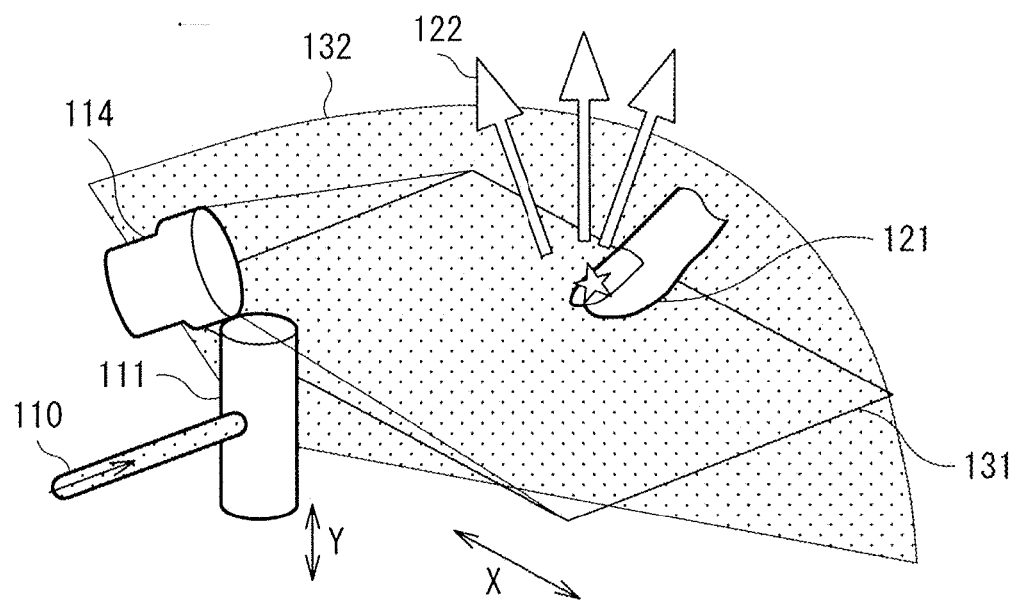
[ FIG. 6 ]
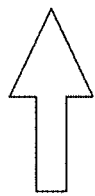

[FIG. 7]
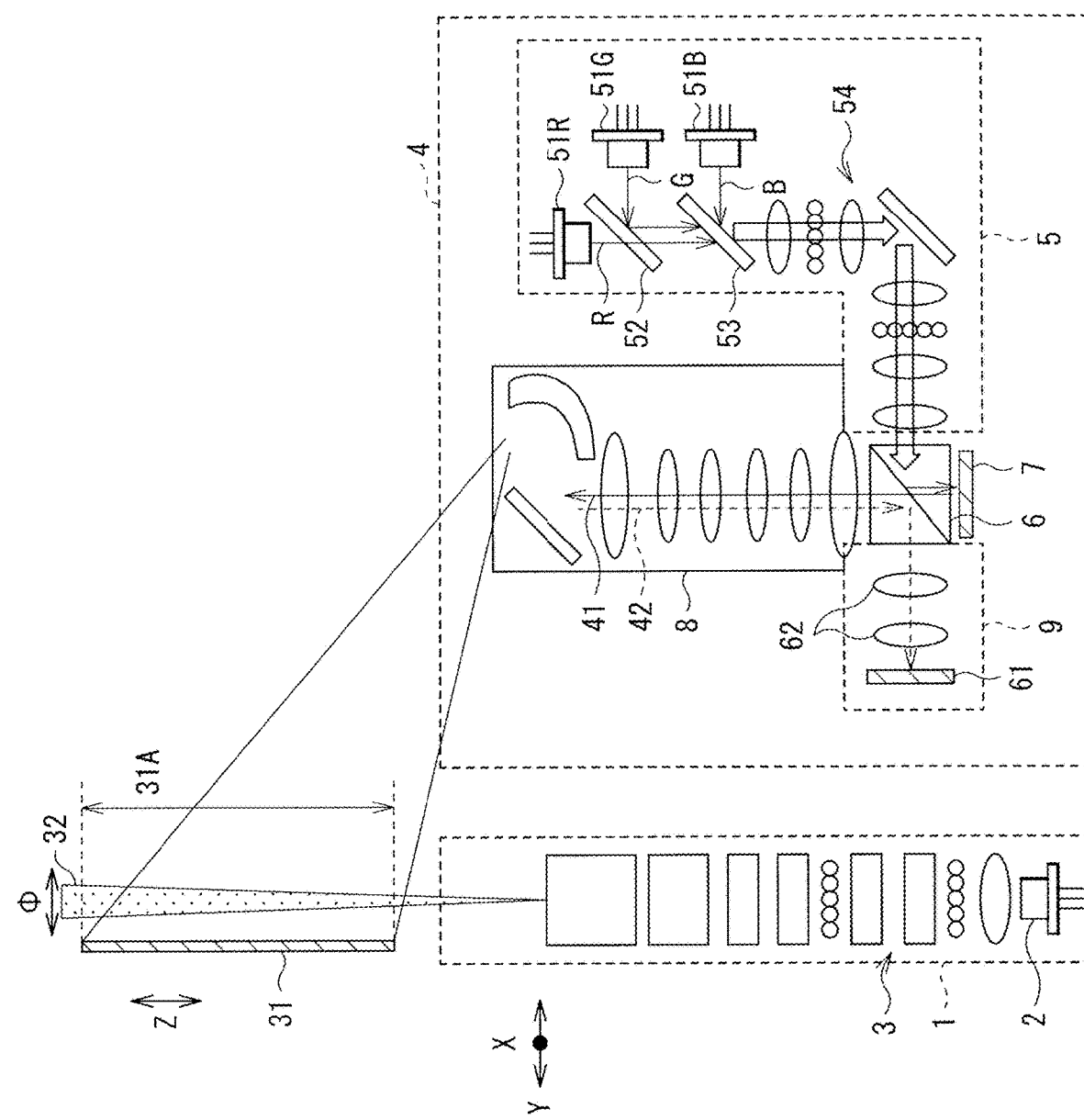

[ FIG. 8 ]
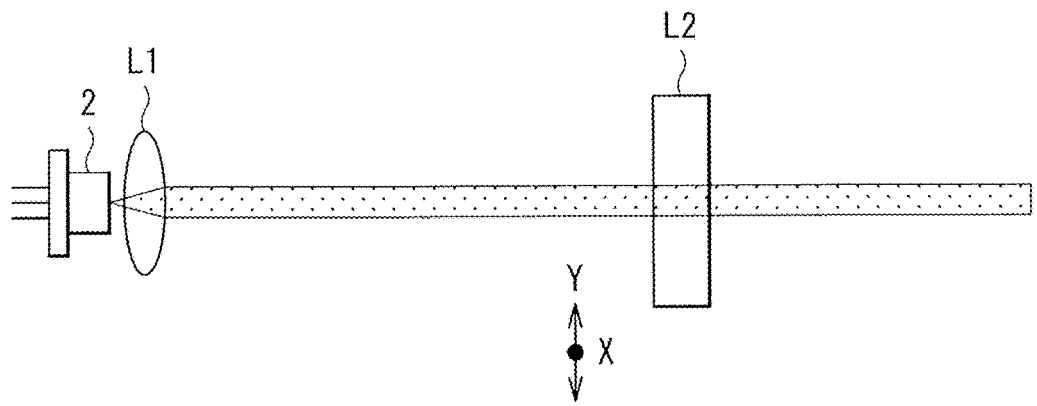
[ FIG. 9 ]
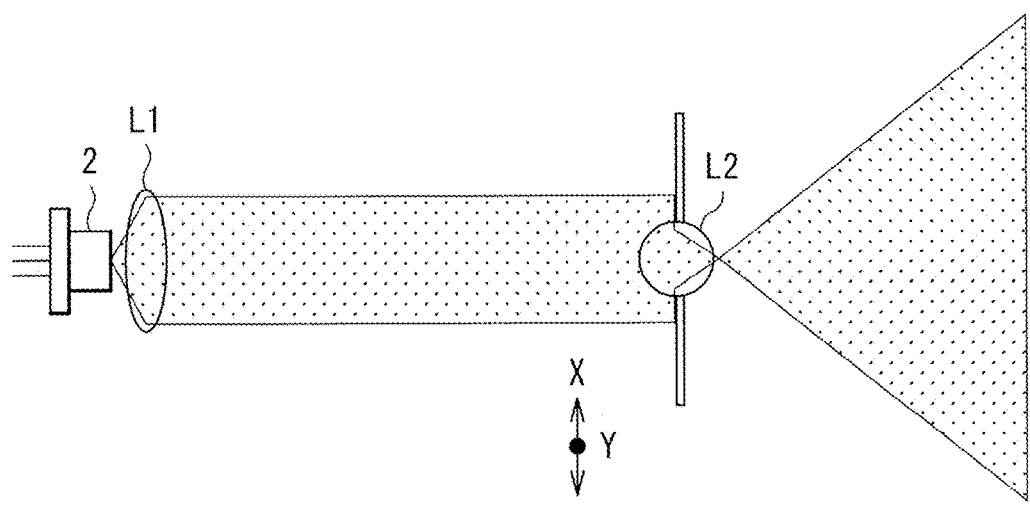
[ FIG. 10 ]
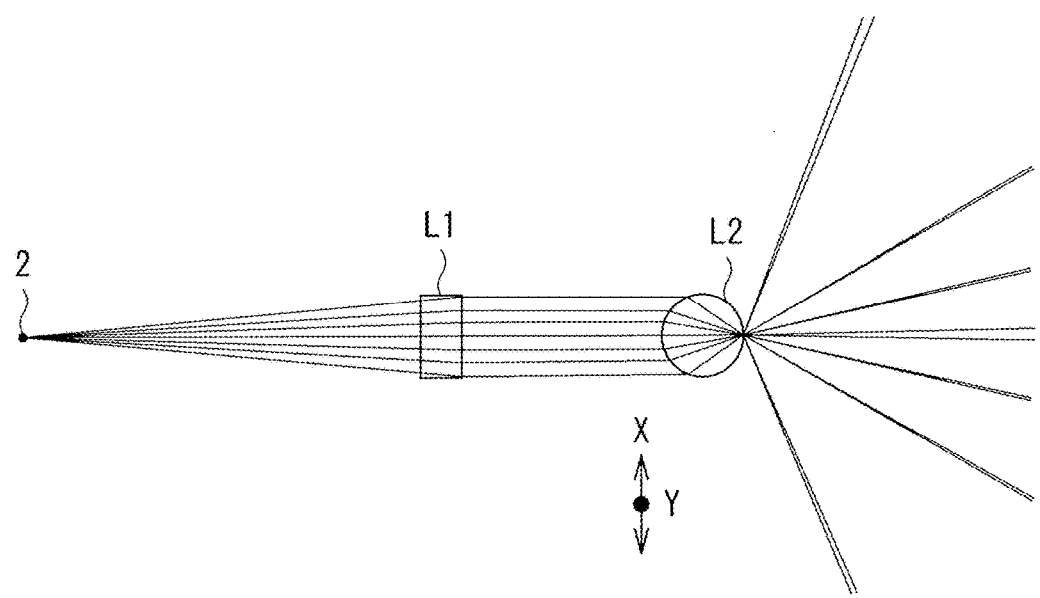

[ FIG. 11 ]
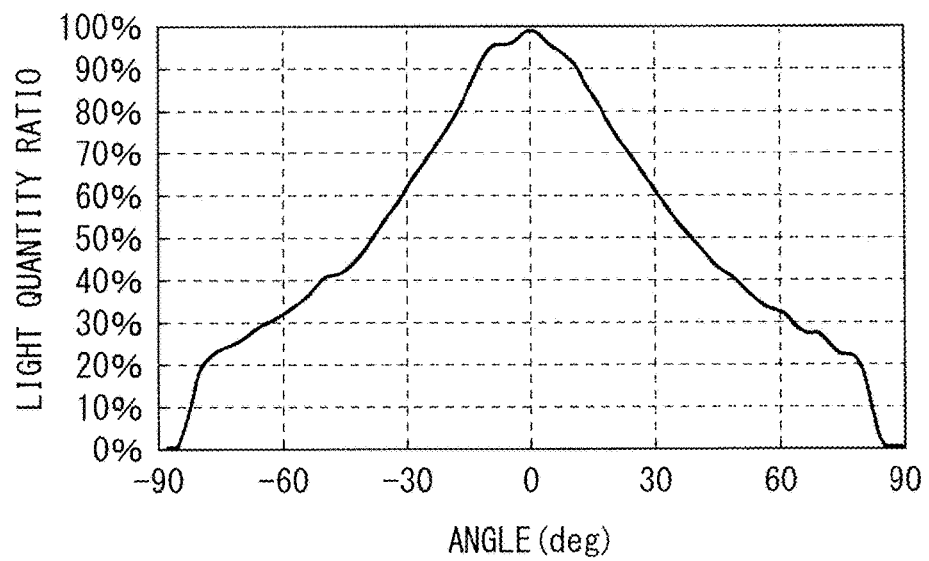
[ FIG. 12 ]
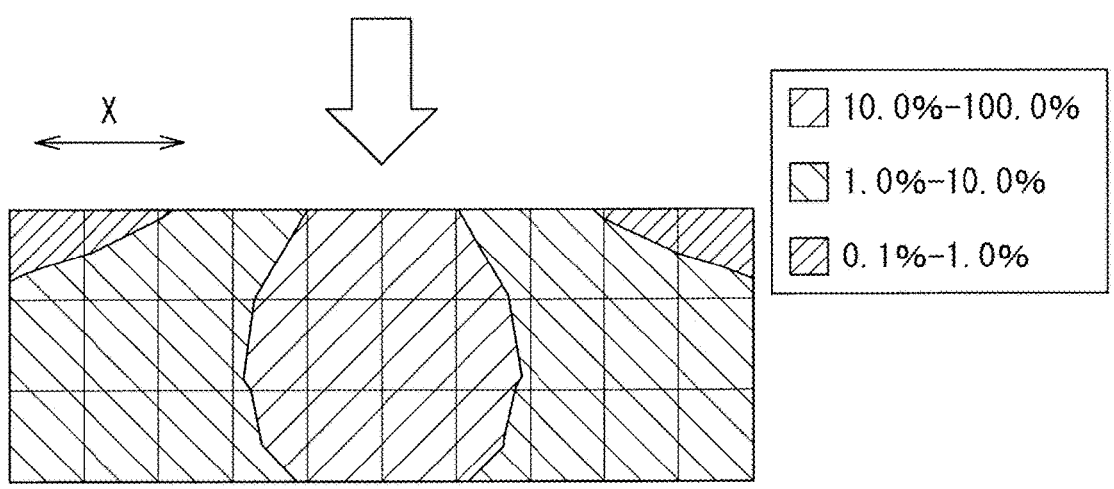

[ FIG. 13 ]
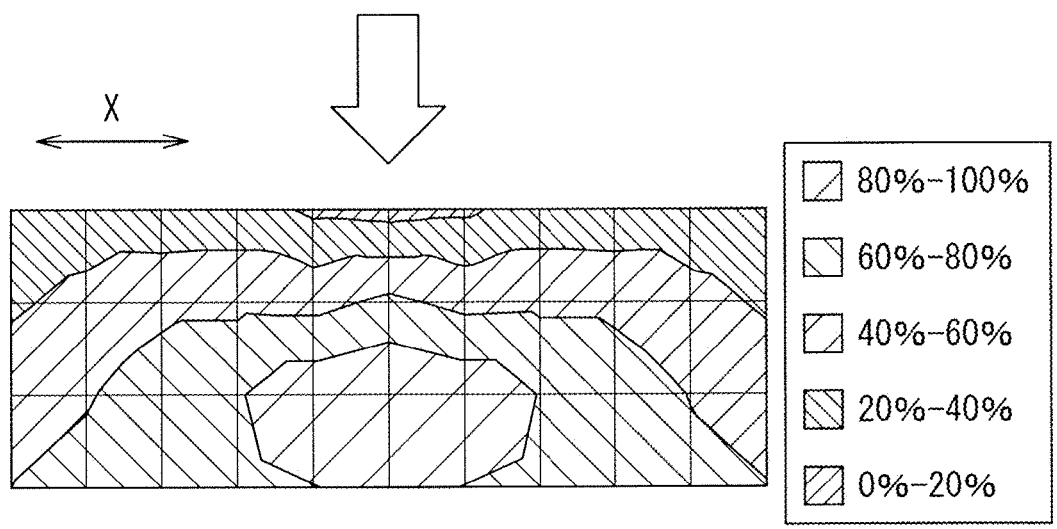
[ FIG. 14 ]
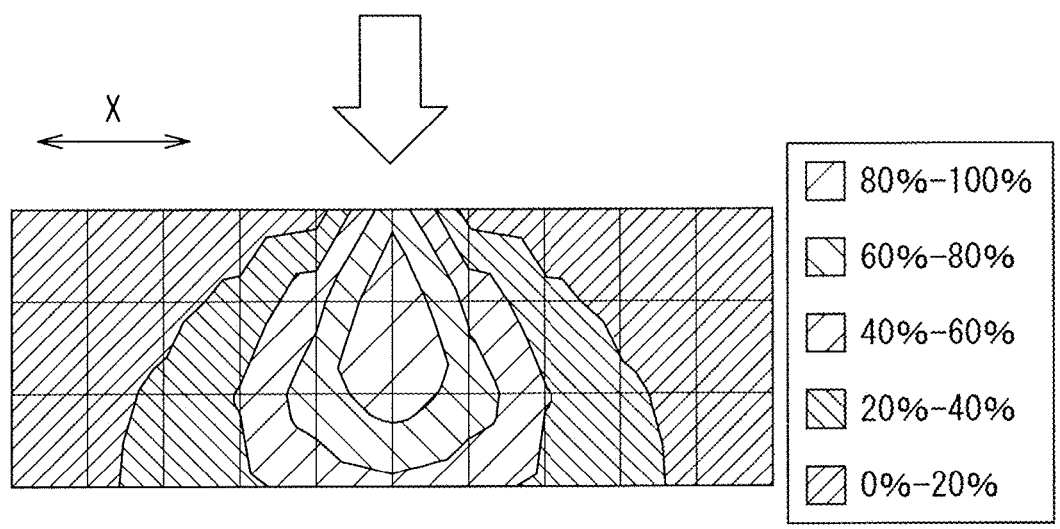

[ FIG. 15 ]
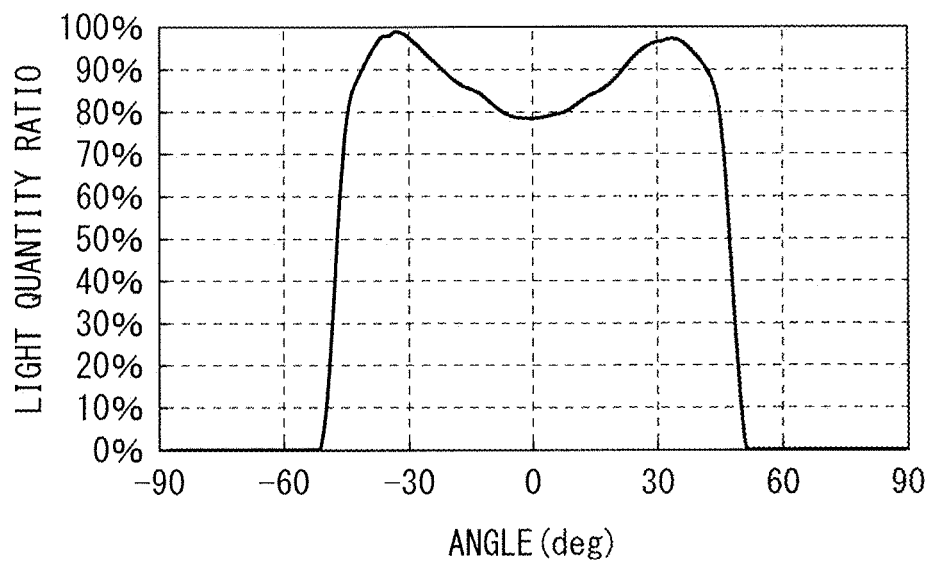
[ FIG. 16 ]
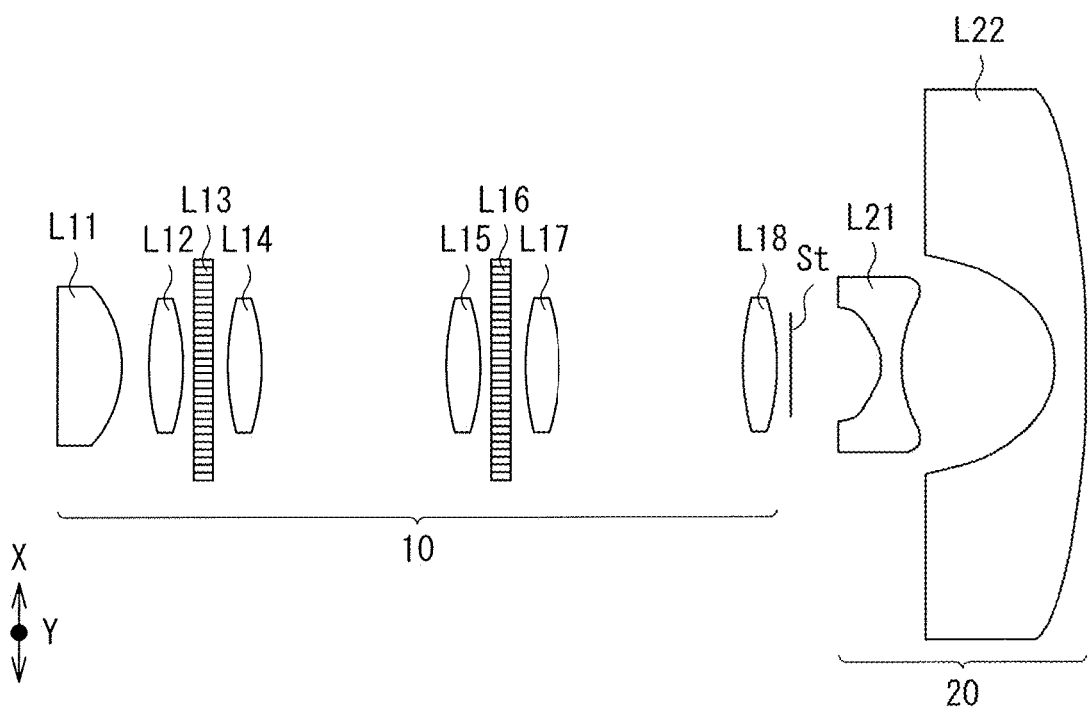

[ FIG. 17 ]
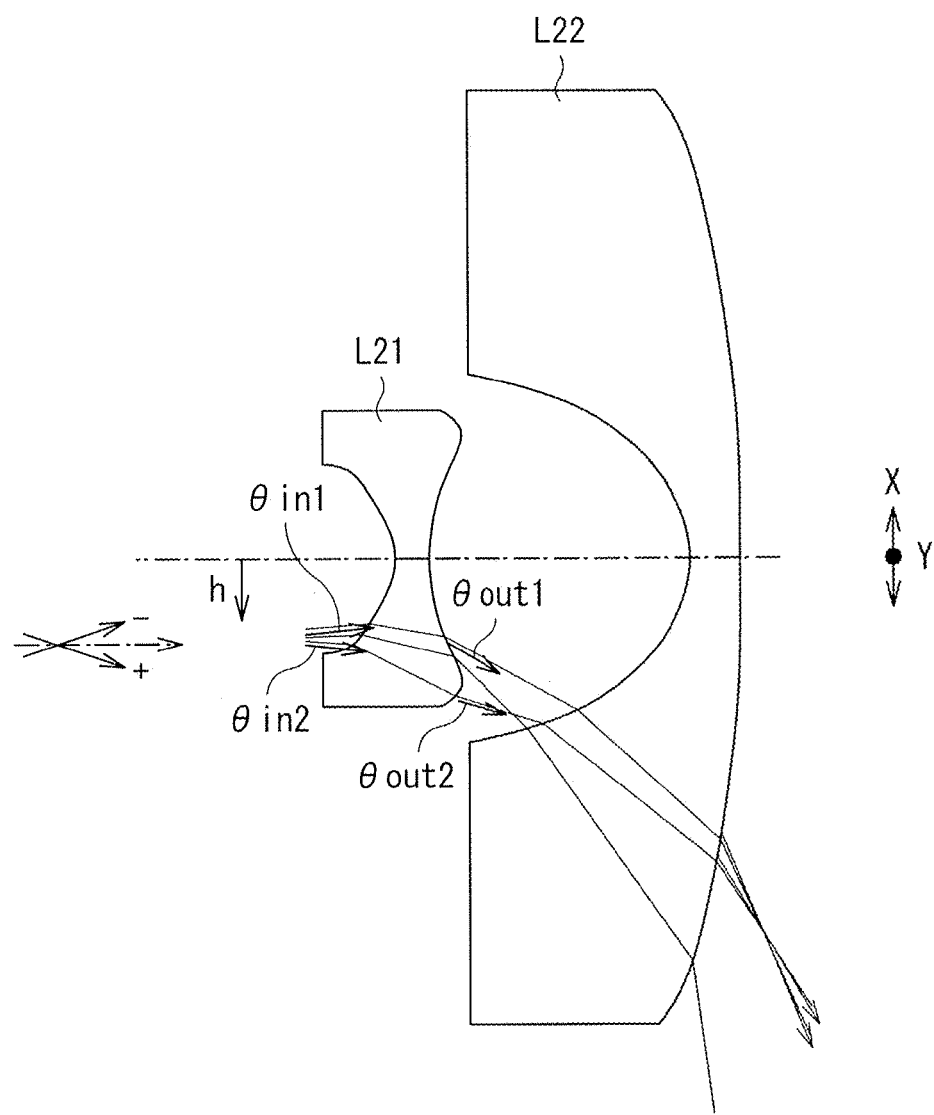

[ FIG. 18 ]
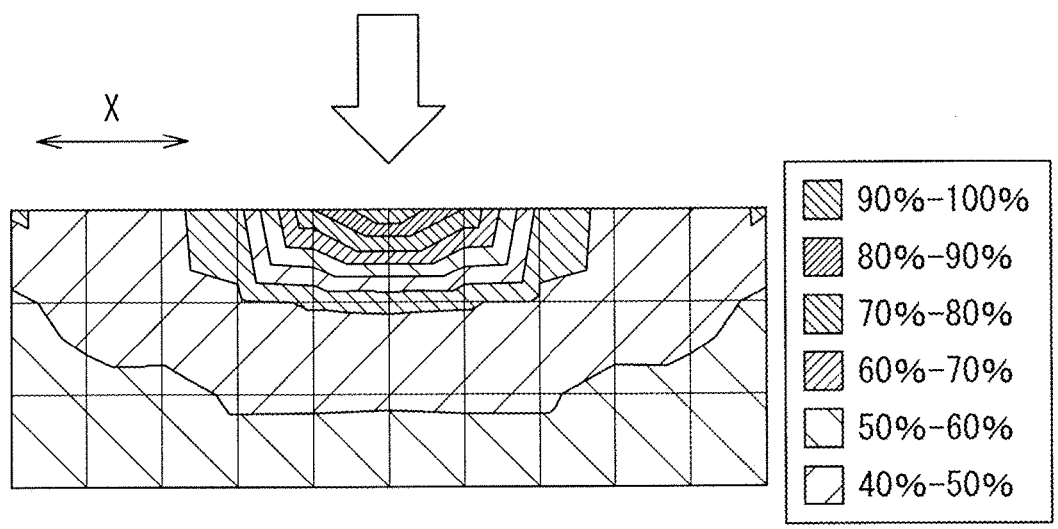
[ FIG. 19 ]
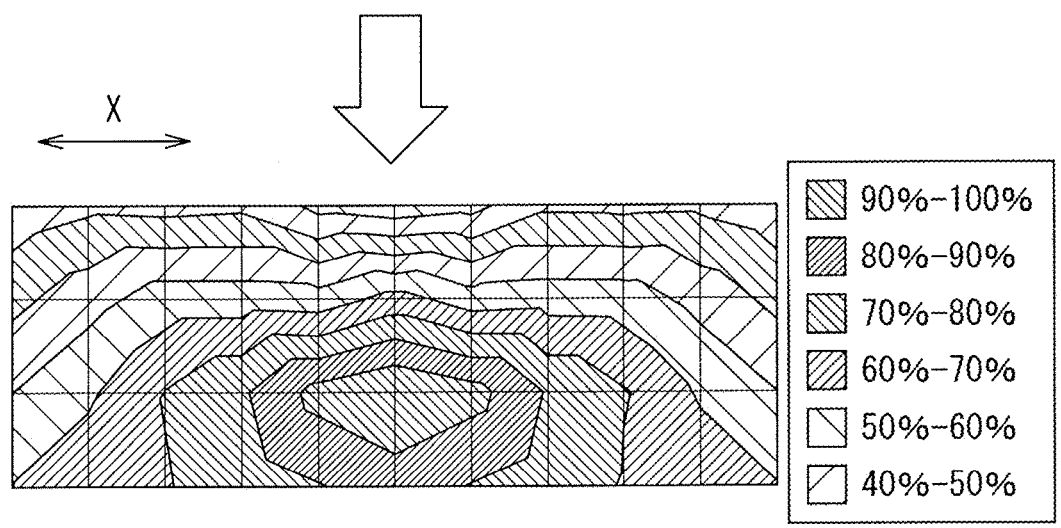

[ FIG. 20 ]
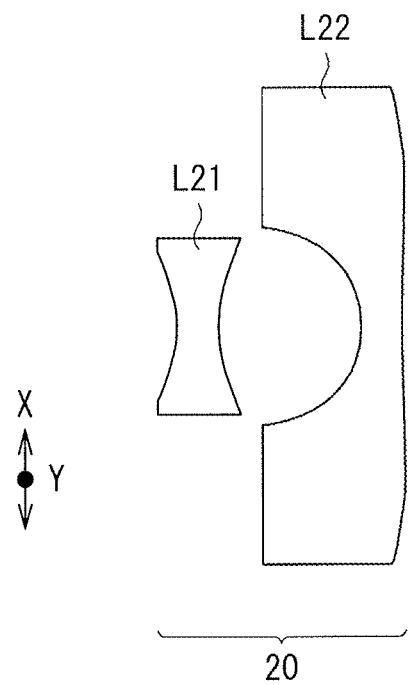
[ FIG. 21 ]
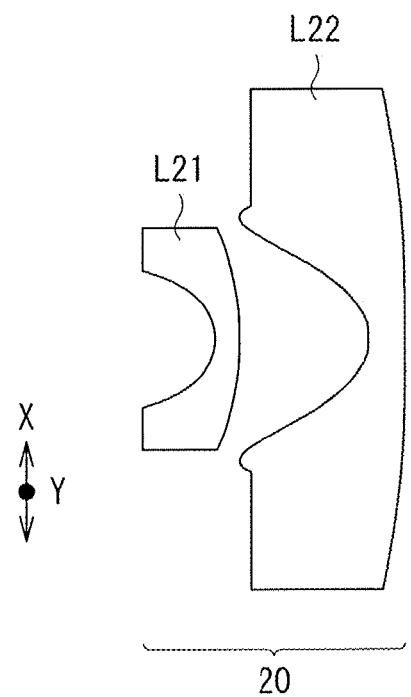

[ FIG. 22 ]
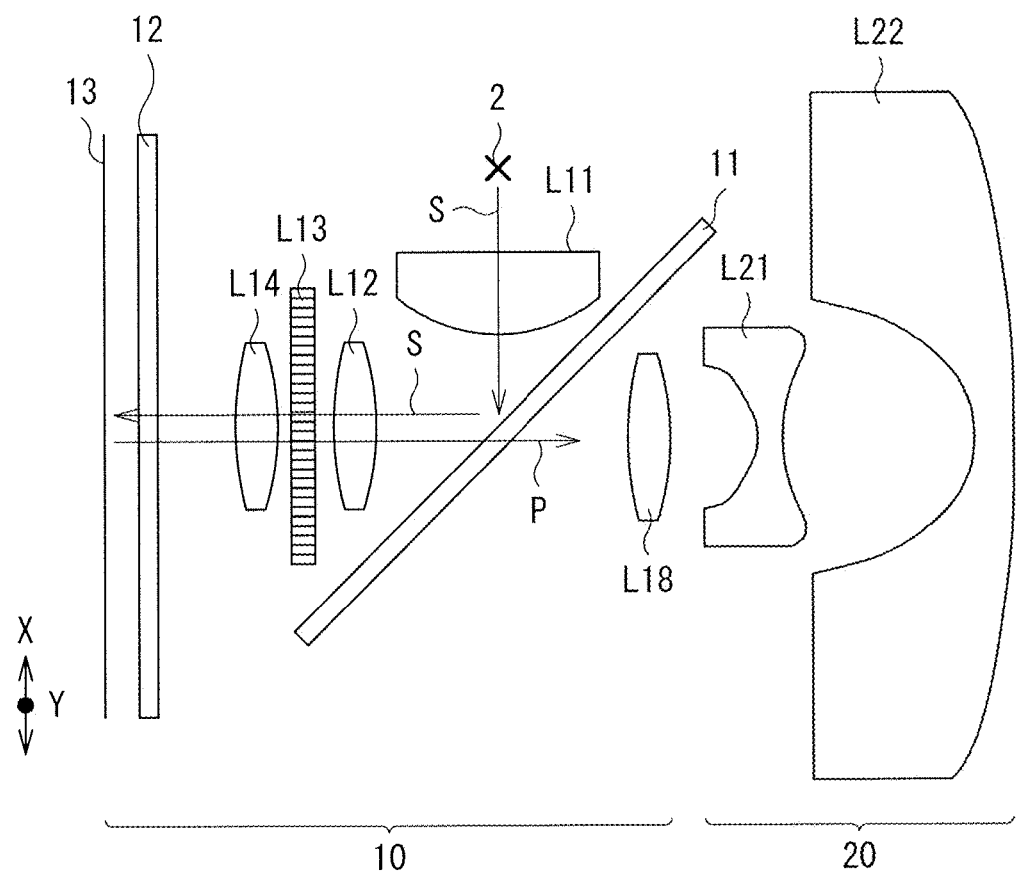

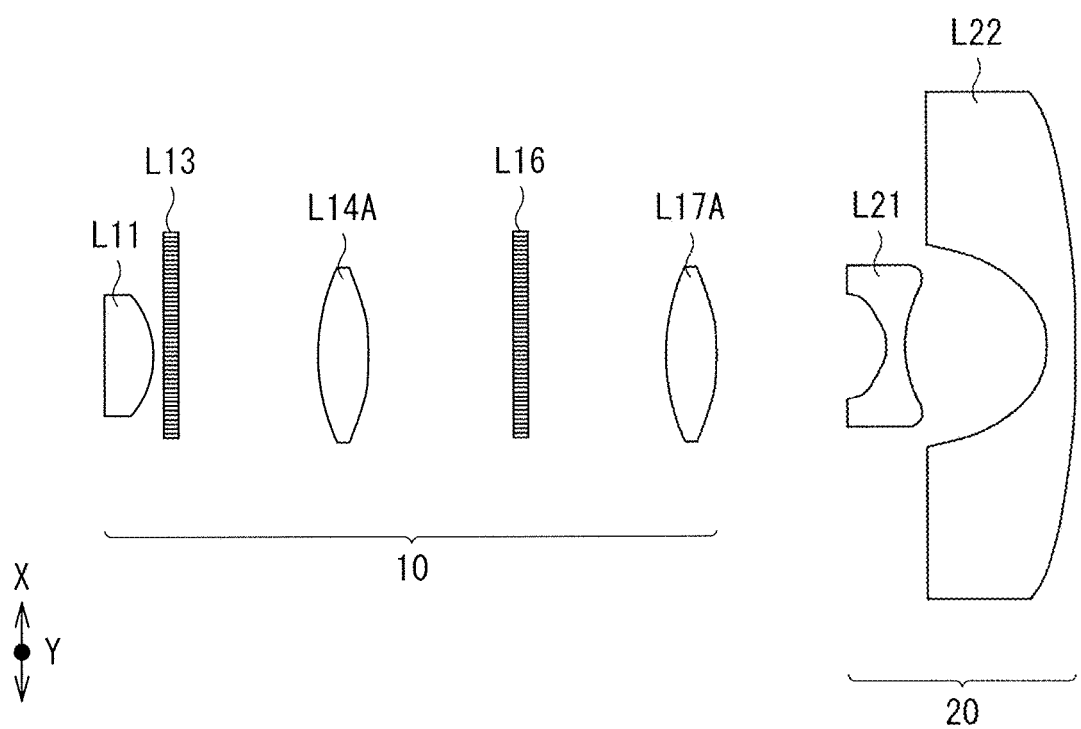
[ FIG. 23 ]

[ FIG. 24 ]
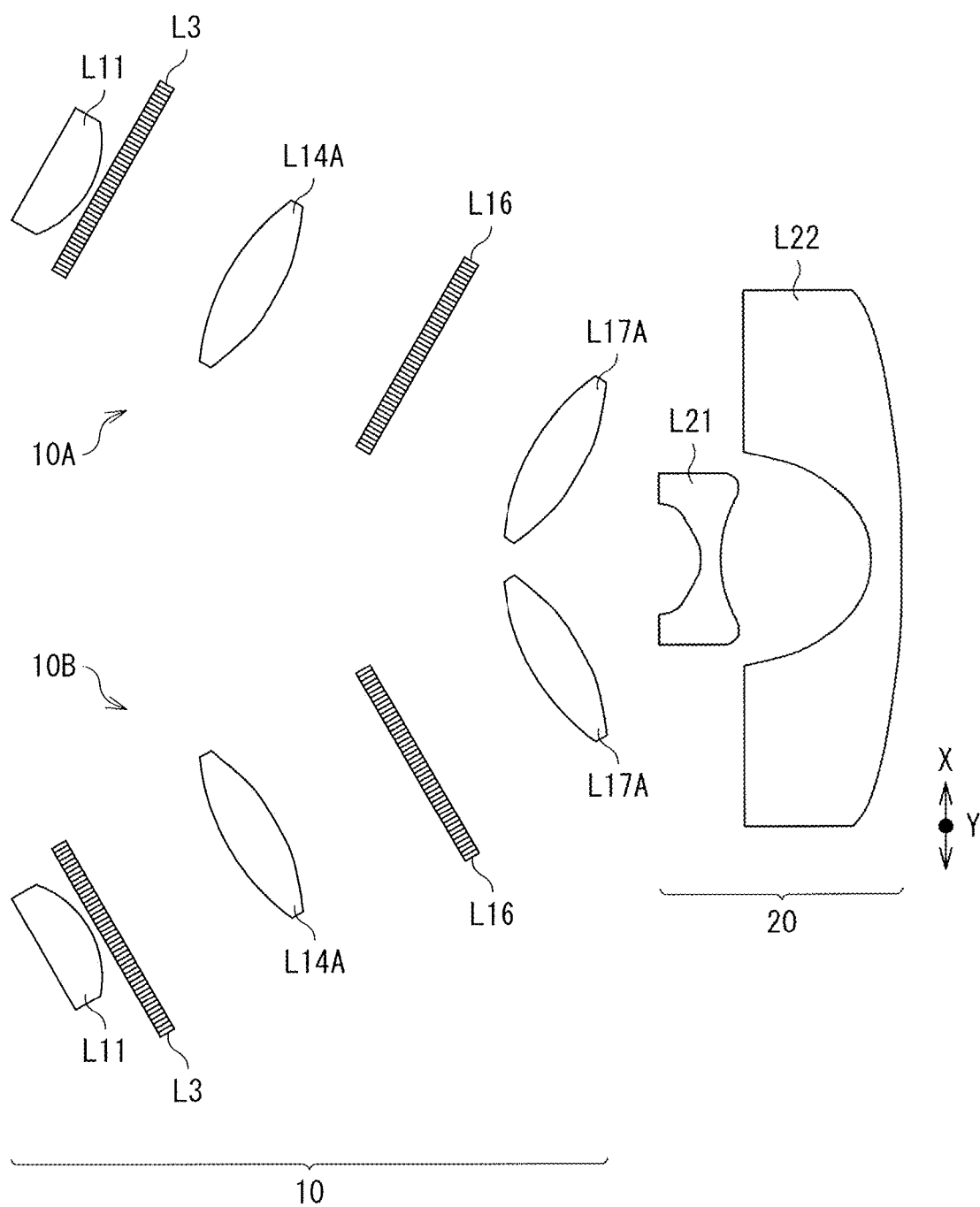

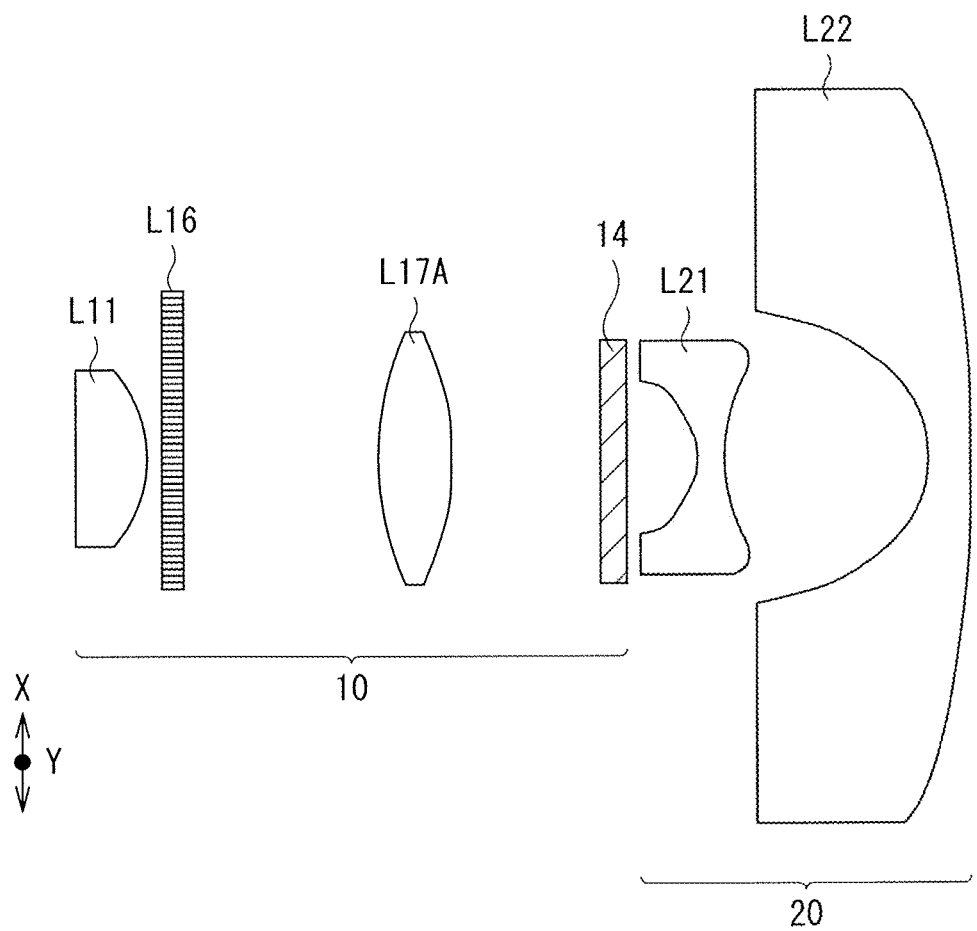
[ FIG. 25 ]

IRRADIATION OPTICAL SYSTEM AND PROJECTOR

CROSS-REFERENCE TO RELATED APPLICATIONS

The present application claims the benefit under 35 U.S.C. § 120 as a continuation application of U.S. application Ser. No. 15/546,782, filed on Jul. 27, 2017, now U.S. Pat. No. 10,459,575, which claims the benefit under 35 U.S.C. § 371 as a U.S. National Stage Entry of International Application No. PCT/JP2015/084354, filed in the Japanese Patent Office as a Receiving Office on Dec. 8, 2015, which claims priority to Japanese Patent Application Number JP 2015-021020, filed in the Japanese Patent Office on Feb. 5, 2015, each of which is hereby incorporated by reference in its entirety.

TECHNICAL FIELD

The disclosure relates to an irradiation optical system used in, for example, an interactive detection technology, and to a projector that projects an image.

BACKGROUND ART

Interactive detection of laser light plane (LPP) system has been known as an interactive detection technology for a projector and a large screen (refer to PTLs 1 and 2). As the interactive detection technology, a method is known in which an irradiation optical system generates a thin light film on a detectable surface such as a projection surface of the projector. When an object such as a finger passes through the thin light film, scattering light occurs at a site of the light film through which the object passes. The scattering light is detected as detected light by a camera. This makes it possible to determine a position of the object to perform, for example, an interactive operation. In the interactive detection technology, an infrared ray is commonly used to make the irradiation light invisible.

CITATION LIST

Patent Literature

PTL 1: Japanese Unexamined Patent Application Publication No. 2010-191961
PTL 2: Japanese Unexamined Patent Application Publication No. 2009-205442
PTL 3: Japanese Unexamined Patent Application Publication No. 2004-258620
PTL 4: U.S. Pat. No. 4,826,299
PTL 5: Japanese Unexamined Patent Application Publication No. 2001-282446

SUMMARY OF INVENTION

Image projection with an ultrawide-angle may be demanded in some cases as a specification of a projector. In this case, for example, an ultrashort-focus lens as disclosed in PTL 3 may be used as a projection optical system. In addition, as an irradiation optical system in the interactive detection technology, for example, a rod lens or a lens having refractive power only in one direction as disclosed in PTL 5 may be used. Further, a laser line generator lens (a Powell lens) as disclosed in PTL 4 may be used. In the case where the interactive detection technology is applied to the ultrawide-angle projector, however, it may be difficult to irradiate a wide-angle range with the irradiation optical system, causing the manufacturing thereof to be complicated. In addition, adjustment flexibility of light quantity in plane may be reduced.

It is therefore desirable to provide an irradiation optical system and a projector that make it possible to form a substantially uniform light film.

An irradiation optical system according to an embodiment of the disclosure includes a uniformizing section and an irradiation lens section. The uniformizing section brings in-plane distribution of light emitted from a light source, close to uniform in-plane distribution. The irradiation lens section diffuses the light in a predetermined direction. The in-plane distribution of the light is brought close to the uniform in-plane distribution by the uniformizing section. The irradiation lens section includes, in order from the light source, a first cylindrical lens and a second cylindrical lens each having negative refractive power in the predetermined direction.

A projector according to an embodiment of the disclosure is provided with a visible light projection optical system and an irradiation optical system. The visible light projection optical system projects an image on a visible light projection surface. The irradiation optical system forms a light film substantially parallel to the visible light projection surface. The irradiation optical system includes a uniformizing section and an irradiation lens section. The uniformizing section brings in-plane distribution of light emitted from a light source, close to uniform in-plane distribution. The irradiation lens section diffuses the light in a predetermined direction. The in-plane distribution of the light is brought close to the uniform in-plane distribution by the uniformizing section. The irradiation lens section includes, in order from the light source, a first cylindrical lens and a second cylindrical lens each having negative refractive power in the predetermined direction.

In the irradiation optical system and the projector according to the respective embodiments of the disclosure, the in-plane distribution of the light emitted from the light source is brought close to uniform, and the light is diffused in the predetermined direction by the irradiation lens section that includes the first and second cylindrical lenses.

According to the irradiation optical system and the projector of the respective embodiments of the disclosure, the light in which the in-plane distribution is brought close to uniform is diffused in the predetermined direction by the irradiation lens section that includes the first and second cylindrical lenses. This makes it possible to form the substantially uniform light film.

It is to be noted that effects described herein are not necessarily limitative, and may be any effects described in the disclosure.

BRIEF DESCRIPTION OF DRAWINGS

FIG. 1 is an explanatory diagram schematically illustrating a concept of interactive detection of LLP system.
FIG. 2 is an explanatory diagram schematically illustrating a concept of infrared irradiation in a case where an image is projected to a vicinity of a projector at a wide-angle.
FIG. 3 is an explanatory diagram schematically illustrating the concept of the infrared irradiation using two rod lenses.
FIG. 4 is an explanatory diagram illustrating an example of a state of the infrared irradiation illustrated in FIG. 3 as viewed from a front direction.

FIG. 5 is an explanatory diagram schematically illustrating the concept of the interactive detection using a projection and light-receiving lens.

FIG. 6 is an explanatory diagram schematically illustrating an example of in-plane distribution of infrared irradiation light that is observed through the projection and light-receiving lens illustrated in FIG. 5.

FIG. 7 is a cross-sectional view of a configuration example of a projector according to a first embodiment of the disclosure.

FIG. 8 is a cross-sectional view of an optical system illustrating a configuration example in Y direction of an irradiation optical system according to a comparative example.

FIG. 9 is a cross-sectional view of an optical system illustrating a configuration example in X direction of the irradiation optical system according to the comparative example.

FIG. 10 is a cross-sectional view of an optical system corresponding to a specific numerical design example of the irradiation optical system according to the comparative example.

FIG. 11 is an explanatory diagram schematically illustrating an example of angular distribution of infrared irradiation light in a case where the irradiation optical system according to the comparative example is used.

FIG. 12 is an explanatory diagram schematically illustrating an example of in-plane distribution of the infrared irradiation light in the case where the irradiation optical system according to the comparative example is used.

FIG. 13 is an explanatory diagram schematically illustrating an example of in-plane distribution of light that is taken in a visible light projection optical system.

FIG. 14 is an explanatory diagram schematically illustrating an example of final in-plane distribution of light (in-plane distribution of light that is taken in an infrared imaging device) that is a combination of the in-plane distribution of FIG. 12 and the in-plane distribution of FIG. 13.

FIG. 15 is an explanatory diagram schematically illustrating an example of angular distribution of infrared irradiation light in a case where a Powell lens is used for the irradiation optical system.

FIG. 16 is a cross-sectional view of an optical system illustrating a configuration example of an irradiation optical system according to the first embodiment of the disclosure.

FIG. 17 is an explanatory diagram schematically illustrating an action of an aspherical surface of an irradiation lens section in the irradiation optical system illustrated in FIG. 16.

FIG. 18 is an explanatory diagram schematically illustrating an example of in-plane distribution of infrared irradiation light by the irradiation optical system illustrated in FIG. 16.

FIG. 19 is an explanatory diagram schematically illustrating an example of final in-plane distribution of light (in-plane distribution of light that is taken in the infrared imaging device) that is a combination of the in-plane distribution of FIG. 16 and the in-plane distribution of FIG. 13.

FIG. 20 is a cross-sectional view of an optical system illustrating a configuration example of an irradiation lens section according to a first modification example of the first embodiment.

FIG. 21 is a cross-sectional view of an optical system illustrating a configuration example of an irradiation lens section according to a second modification example of the first embodiment.

FIG. 22 is a cross-sectional view of an optical system illustrating a configuration example of an irradiation optical system according to a second embodiment.

FIG. 23 is a cross-sectional view of an optical system illustrating a configuration example of an irradiation optical system according to a third embodiment.

FIG. 24 is a cross-sectional view of an optical system illustrating a configuration example of an irradiation optical system according to a modification example of the third embodiment.

FIG. 25 is a cross-sectional view of an optical system according to a configuration example of an irradiation optical system according to a fourth embodiment.

DESCRIPTION OF EMBODIMENTS

Some embodiments of the disclosure are described in detail below with reference to drawings. It is to be noted that description is given in the following order.
0. Issues of interactive detection (FIG. 1 to FIG. 6)
1. First Embodiment
   1.1 Explanation of projector (FIG. 7)
   1.2 Configuration and issues of infrared irradiation optical system according to comparative example (FIG. 8 to FIG. 15)
   1.3 Configuration of infrared irradiation optical system according to first embodiment (FIG. 16)
   1.4 Workings and effects of infrared irradiation optical system according to first embodiment (FIG. 17 to FIG. 19)
   1.5 Modification Examples
     1.5.1 First Modification Example (FIG. 20)
     1.5.2 Second Modification Example (FIG. 21)
     1.5.3 Other Modification Examples
2. Second Embodiment (FIG. 22)
3. Third Embodiment
   3.1 Configuration (FIG. 23)
   3.2 Modification Example (FIG. 24)
4. Fourth Embodiment (FIG. 25)
5. Other Embodiments 0. Issues of Interactive Detection FIG. 1 schematically illustrates a concept of interactive detection of LLP system. In the interactive detection technology, for example, a rod lens 111 or a laser line generator lens (a Powell lens) is used as an irradiation optical system to generate a thin light film 132 on a detectable surface such as a projection surface 131 of a projector, as illustrated in FIG. 1. The light film 132 is generated, for example, at a predetermined height with respect to the projection surface 131 of the projector. In addition, infrared light 110 is typically used as the irradiation light so as not to be visually recognizable. The rod lens 111 has refractive power only in a predetermined direction (in X direction in the drawing), and diffuses the incident infrared light 110 in the predetermined direction, thereby generating the light film 132.

As illustrated in FIG. 1, when an indicator (an object) 121 such as a finger passes through the thin light film 132, scattered light 122 occurs on a site through which the indicator passes. A camera 112 detects the scattered light 122 as detected light. This makes it possible to determine a position of the object 121 to allow for interactive touch operation, for example.

In a case where such an interactive detection technology is applied to an ultrawide-angle projector, it may be difficult to irradiate a wide-angle range with the irradiation optical system, causing the manufacturing of such a projector to be complicated as described below. In addition, adjustment flexibility of light quantity in plane may be impaired.

[Difficulty of Covering Wide-Angle Range and Complicated Manufacturing]

FIG. 2 schematically illustrates a concept of infrared irradiation in a case where an image is projected to a vicinity of a projector at a wide-angle. For example, as illustrated in FIG. 2, in a case where the light film 132 is generated on the projection surface 131 with use of a lens such as the rod lens 111 and the Powell lens, with respect to the projector 113 that projects an image to a wide-angle range near the projector, the irradiation light is generated only up to the angular range of about 90 degrees at most in the X direction.

Therefore, to cover an entire region of the projection surface 131, it is necessary to use and dispose a plurality of, for example, two or four rod lenses 111 or Powell lenses. FIG. 3 schematically illustrates a concept of the infrared irradiation using two rod lenses 111A and 111B. FIG. 4 illustrates an example of a state of the infrared irradiation illustrated in FIG. 3 as viewed from a front direction.

In the case where the plurality of rod lenses 111A and 111B are disposed, however, when dispersion occurs in mutual placement angle due to factors such as inclination, angular dispersion occurs on light films 132A and 132B to be generated as illustrated in FIG. 4. As a result, the object-detectable height may become unsuitably increased depending on the position in plane, which causes strangeness in a touch operation. In the case of large inclination, adjustment is performed in manufacturing, which may cause the adjustment process to be extremely complicated.

[Less Adjustment Flexibility of Light Quantity in Plane]

FIG. 5 schematically illustrates a concept of interactive detection using a projection and light-receiving lens. FIG. 6 schematically illustrates an example of in-plane distribution of infrared irradiation light that is observed through the projection and light-receiving lens illustrated in FIG. 5.

A method is known in which a projection and light-receiving lens 114 is used to project an image and to take the detected light of the object 121 as illustrated in FIG. 5. The lens 114 is configured by combining an image projection lens and a light-receiving lens for the detected light. In a case where the interactive detection is performed with use of one projection and light-receiving lens 114, in particular, in an ultrashort-focus projector, for example, a phenomenon is expected in which in-plane distribution of irradiation light that is essentially uniform is unevenly observed as illustrated in FIG. 6. The phenomenon is caused, for example, by variation in transmittance due to peripheral light quantity ratio, vignetting, and image height of the projection and light-receiving lens 114, and by variation in a shadow coefficient. Digital correction may be expected for the unevenness of the in-plane distribution; however, a method of varying the light quantity distribution provided by the irradiation optical system is more effective because of limitation in the dynamic range surface. In this case, flexibility in intensive allocation of the in-plane distribution is low in the rod lens 111 and the Powell lens. In other words, flexibility in installation position and angle is low. As a result, in the case where the rod lens 111 or the Powell lens is used, it is difficult to bring the in-plane distribution of the irradiation light close to a desired in-plane distribution, and thus it is difficult to uniformize the in-plane distribution of the entire interactive system. In the case of the interactive system in which the in-plane distribution of the irradiation light is not uniform, false detection may occur depending on the operation.

1. First Embodiment 1.1 Entire Configuration of Projector

FIG. 7 illustrates a configuration example of a projector according to a first embodiment of the disclosure.

The projector according to the present embodiment includes an interactive detection function that performs image projection and object detection.

The projector includes an infrared irradiation section 1 and a visible-light projection and infrared-light receiving section 4. The visible-light projection and infrared-light receiving section 4 includes a visible light illumination section 5, a polarization separation device 6, a light valve 7, a visible light projection optical system 8, and an infrared light receiving section 9.

The visible light illumination section 5 includes a red light source 51R, a green light source 51G, a blue light source 51B, dichroic mirrors 52 and 53, and a visible light illumination optical system 54.

The red light source 51R is, for example, a red laser light source that emits red light. The green light source 51G is, for example, a green laser light source that emits green light. The blue light source 51B is, for example, a blue laser light source that emits blue light. The dichroic mirror 52 allows the red light from the red light source 51R to pass therethrough toward the dichroic mirror 53, and reflects the green light from the green light source 51G toward the dichroic mirror 53. The dichroic mirror 53 allows the red light and the green light from the dichroic mirror 52 to pass therethrough toward the visible light illumination optical system 54, and reflects the blue light from the blue light source 51B toward the visible light illumination optical system 54.

The visible light illumination optical system 54 generates image projection illumination light of visible light composed of the red light, the green light, and the blue light to illuminate the light valve 7 through the polarization separation device 6. The polarization separation device 6 reflects, toward the light valve 7, light of predetermined polarization component out of the illumination light from the visible light illumination optical system 54.

The light valve 7 is, for example, a reflective liquid crystal device such as liquid crystal on silicon (LCOS). The light valve 7 modulates the light of the predetermined polarization component out of the illumination light from the visible light illumination optical system 54, on the basis of image data. The light valve 7 also outputs the modulated light toward the visible light projection optical system 8 through the polarization separation device 6. The light valve 7 outputs, as the modulated light, the light of the polarization component that has been rotated in the polarization state from the incident state. It is to be noted that the light valve 7 makes it possible to perform black display by returning the incident light of the polarization component to the light valve 7 in the polarization state as is. This generates an image of the visible light.

The visible light projection optical system 8 is configured by, for example, a wide-angle ultrashort-focus lens. An image of visible light 41 generated by the light valve 7 is displayed on a visible light projection surface 31 such as a screen, by the visible light projection optical system 8.

The infrared irradiation section 1 includes an infrared light source 2 and an irradiation optical system 3. For example, the infrared light source 2 is an infrared laser light source that emits infrared light having a wavelength of 700 nm or larger. The irradiation optical system 3 forms a light film 32 that is substantially parallel to the visible light projection surface 31. The light film 32 has a predetermined height with respect to the visible light projection surface 31, and is formed in a region 31A corresponding to at least the visible light projection surface 31. When an object such as a finger enters the light film 32, the infrared light hit to the object such as a finger is scattered. The scattered infrared light is detected as detected light 42 by the infrared light receiving section 9 through the visible light projection optical system 8.

The infrared light receiving section 9 includes an infrared imaging device 61 and an infrared receiving optical system 62. The infrared imaging device 61 is conjugate to the visible light projection surface 31. The position at which the infrared light is actually scattered is brightly reflected, which allows the infrared imaging device 61 to detect the position of the object such as a finger.

In the present embodiment, the irradiation optical system 3 of the infrared irradiation section 1 has the specific configuration as illustrated in FIG. 16. Before description of the configuration illustrated in FIG. 16, a configuration and issues of an infrared irradiation optical system according to a comparative example are first described.

1.2 Configuration and Issues of Infrared Irradiation Optical System According to Comparative Example FIG. 8 illustrates a configuration example of a cross-section in Y direction of the irradiation optical system according to the comparative example. FIG. 9 illustrates a configuration example of a cross-section (a cross-section as viewed from a top surface direction) in X direction of the irradiation optical system according to the comparative example.

The irradiation optical system according to the comparative example illustrated in FIG. 8 and FIG. 9 includes a collimator lens L1 and a rod lens L2 in order from incident side of the light emitted from the infrared light source 2. In the irradiation optical system according to the comparative example, parallel light is created by the collimator lens L1. After creation of a parallel light beam as basic light, the parallel light beam enters the rod lens L2 to generate the light film 32 at the predetermined height with respect to the visible light projection surface 31.

Here, Table 1 illustrates a specific numerical design example of the irradiation optical system according to the comparative example. In addition, FIG. 10 is a cross-sectional view of the optical system in the X direction corresponding to the specific numerical design example. It is to be noted that Table 1 illustrates, as design parameters, a surface number of the irradiation optical system, a type of the surface, a paraxial curvature radius (R), a surface interval (d) on an optical axis, a value (nd) of refractive index on d line (wavelength of 587.6 nm), and a value (vd) of Abbe number on the d line. A surface S0 corresponds to the infrared light source 2.

TABLE 1

| Surface No. | Type of Surface | R | d | nd | vd |
|---|---|---|---|---|---|
| S0 | — | Infinity | 9.50 | | |
| S1 | Spherical Surface | Infinity | 1.00 | 1.517 | 64.2 |
| S2 | Spherical Surface | −5.11 | 5.00 | | |
| S3 | Cylindrical Surface | 1.00 | 2.00 | 1.517 | 64.2 |
| S4 | Cylindrical surface | −1.00 | 600 | | |

As illustrated in Table 1, both surfaces of the collimator lens L1 are spherical surfaces. Both surfaces of the rod lens L2 are cylindrical surfaces each having refractive power in the X direction.

FIG. 11 schematically illustrates angular distribution of the infrared irradiation light in the case where the irradiation optical system according to the comparative example is used. In FIG. 11, a horizontal axis indicates an angle, and a vertical axis indicates light quantity ratio. FIG. 12 schematically illustrates an example of in-plane distribution of the infrared irradiation light in the case where the irradiation optical system according to the comparative example is used. FIG. 12 illustrates intensity distribution of the light in a case where the visible light projection surface 31 of 25 inches (16:9) is provided at a distance of 40 mm, and the light film 32 is generated on the visible light projection surface 31. As illustrated in FIG. 11 and FIG. 12, the light quantity in a center region is extremely large whereas the light quantity in a peripheral region is largely decreased in the irradiation optical system according to the comparative example. It is difficult to use the irradiation optical system according to the comparative example directly in a wide-angle ultrashort-focus projector. The irradiation optical system according to the comparative example has a distribution range similar to the in-plane distribution illustrated in FIG. 6, thus making the in-plane distribution still more nonuniform. As an alternative method, for example, the plurality of rod lenses 111A and 111B may be disposed side by side as illustrated in FIG. 3 to mutually compensate the in-plane distribution; however, advanced adjustment work is disadvantageously necessary in this case because angular dispersion occurs on the light films 132A and 132B to be generated when the rod lenses 111A and 111B are inclined as illustrated in FIG. 4.

FIG. 13 schematically illustrates an example of in-plane distribution of the light taken in the visible light projection optical system 8. FIG. 14 schematically illustrates an example of final in-plane distribution of light (in-plane distribution of the light taken in the infrared imaging device 61) that is a combination of the in-plane distribution of FIG. 13 and the in-plane distribution provided by the irradiation optical system according to the comparative example of FIG. 12.

In the in-plane distribution of FIG. 13 and FIG. 14, a received light beam is balanced through installation of a light shielding mask in the optical path of each of the visible light projection optical system 8 and the infrared light receiving section 9. The in-plane light quantity ratio of about 30% or more is necessary as a guide for the final in-plane distribution of the light that is taken in the infrared imaging device 61; however, the distribution in the example illustrated in FIG. 14 is significantly lower than such in-plane light quantity ratio. Therefore, it is necessary to balance the in-plane light quantity by, for example, installing a reflective mirror on a side surface, which disadvantageously increases the number of components.

In addition, FIG. 15 schematically illustrates, as a reference, an example of angular distribution of infrared irradiation light in a case where a Powell lens is used in the irradiation optical system. It is to be noted that a divergence angle is disadvantageously reduced, in the first place, in the case where the Powell lens is used. As illustrated in FIG. 15, in the case where the Powell lens is used, the angular distribution becomes extremely narrow, thus making it difficult to form the uniform light film 32 for image projection near the projector at a wide angle.

1.3 Configuration of Infrared Irradiation Optical System According to First Embodiment FIG. 16 illustrates a configuration example of the irradiation optical system 3 according to the first embodiment of the disclosure.

As illustrated in FIG. 16, the irradiation optical system includes a uniformizing section 10 and an irradiation lens section 20 in order from the infrared light source 2. The uniformizing section 10 brings the in-plane distribution of the light from the infrared light source 2 close to uniform in-plane distribution. The irradiation lens section 20 diffuses, in the predetermined direction (in the X direction), the light, the in-plane distribution of which has been brought close to the uniform in-plane distribution by the uniformizing section 10. A mechanical aperture St is disposed between the uniformizing section 10 and the irradiation lens section 20.

The uniformizing section 10 includes, in order from the infrared light source 2 side, a collimator lens L11, a relay lens L12, a cylindrical lens array L13, a relay lens L14, a relay lens L15, a cylindrical lens array L16, a relay lens L17, and a relay lens L18.

The irradiation lens section 20 includes a first irradiation lens L21 and a second irradiation lens L22 in order from the infrared light source 2 side. The first irradiation lens L21 is configured by a first cylindrical lens having negative refractive power in a predetermined direction. The second irradiation lens L22 is configured by a second cylindrical lens having negative refractive power in a predetermined direction.

Table 2 and Table 3 illustrate specific numerical examples corresponding to the irradiation optical system 3 illustrated in FIG. 16. It is to be noted that similar design parameters are also illustrated as for other numerical examples described later.

Table 2 illustrates a surface number, a type of surface, a paraxial curvature radius (R), a surface interval (d) on an optical axis, a value (nd) of refractive index on d line (wavelength of 587.6 nm), and a value (vd) of Abbe number on the d line. A surface S0 corresponds to the infrared light source 2.

Table 3 illustrates a coefficient of an aspherical surface, and array widths of the respective cylindrical lens arrays L13 and L16. The aspherical surface shape is defined by the following expression. It is to be noted that, in Table 3, "E-i" represents an exponential expression having 10 as a base, i.e., "$10^{-i}$". For example, "0.12345E-05" represents "$0.12345 \times 10^{-5}$". In addition, in the expression of the aspherical surface shape, z denotes a depth (a sag quantity) of the aspherical surface, c denotes paraxial curvature equal to 1/R, r denotes a distance from the optical axis to the lens surface (in the case of the cylindrical surface, r denotes a distance in the X direction), k denotes a conic constant, and $\beta n$ denotes an n-th order aspherical surface coefficient.

$$z = \frac{cr^2}{1 + \sqrt{1-(1+k)c^2 r^2}} + \beta_1 r^1 + \beta_2 r^2 + \beta_3 r^3 + \beta_4 r^4 + \beta_5 r^5 + \beta_6 r^6 + \beta_7 r^7 + \beta_8 r^8$$

[Numerical Expression 1]

TABLE 2

| Surface No. | Type of Surface | R | d | nd | vd |
|---|---|---|---|---|---|
| S0 | — | Infinity | 7.40 | | |
| S1 | Spherical Surface | Infinity | 2.80 | 1.585 | 29.9 |
| S2 | Aspherical surface | −5.16 | 3.00 | | |
| S3 | Cylindrical Surface | 12.54 | 1.50 | 1.585 | 29.9 |
| S4 | Cylindrical Surface | −12.54 | 0.50 | | |
| S5 | Aspherical Cylindrical Array | 0.357 | 0.95 | 1.544 | 56.6 |
| S6 | Aspherical Cylindrical Array | −0.357 | 0.50 | | |
| S7 | Cylindrical Surface | 12.54 | 1.50 | 1.585 | 29.9 |
| S8 | Cylindrical Surface | −12.54 | 8.22 | | |
| S9 | Cylindrical Surface | 12.54 | 1.50 | 1.585 | 29.9 |
| S10 | Cylindrical Surface | −12.54 | 0.50 | | |
| S11 | Aspherical Cylindrical Array | 0.357 | 0.95 | 1.544 | 56.6 |
| S12 | Aspherical Cylindrical Array | −0.357 | 0.50 | | |
| S13 | Cylindrical Surface | 12.54 | 1.50 | 1.585 | 29.9 |
| S14 | Cylindrical Surface | −12.54 | 8.22 | | |
| S15 | Cylindrical Surface | 12.54 | 1.50 | 1.585 | 29.9 |
| S16 | Cylindrical Surface | −12.54 | 0.50 | | |
| S17 | Spherical Surface | Infinity | 2.00 | | |
| S18 | Aspherical Cylindrical Surface | −1.97 | 1.00 | 1.531 | 56.0 |
| S19 | Aspherical Cylindrical Surface | 7.24 | 7.40 | | |
| S20 | Aspherical Cylindrical Surface | −3.77 | 1.50 | 1.531 | 56.0 |
| S21 | Aspherical Cylindrical Surface | −63.94 | 40.00 | | |
| S22 | Spherical Surface | Infinity | | | |

TABLE 3

| Surface No. | k | β4 | β6 | β8 |
|---|---|---|---|---|
| S2 | −0.317 | 2.230E−04 | 5.527E−06 | 1.671E−07 |
| S5 | −1.157 | 0 | 0 | 0 |
| S6 | −1.157 | 0 | 0 | 0 |
| S11 | −1.157 | 0 | 0 | 0 |
| S12 | −1.157 | 0 | 0 | 0 |
| S18 | −0.765 | 9.693E−03 | 4.791E−04 | 3.345E−04 |
| S19 | 1.536 | 2.945E−03 | −6.379E−05 | −1.972E−05 |
| S20 | −1.147 | −2.129E−03 | 1.730E−05 | −1.522E−06 |
| S21 | 6.396 | −7.267E−05 | 7.590E−07 | −2.404E−09 |

| Surface No. | β10 | β12 | β14 | Array Width |
|---|---|---|---|---|
| S2 | 0 | 0 | 0 | — |
| S5 | 0 | 0 | 0 | 0.3 |
| S6 | 0 | 0 | 0 | 0.3 |
| S11 | 0 | 0 | 0 | 0.3 |
| S12 | 0 | 0 | 0 | 0.3 |
| S18 | −3.896E−06 | −7.760E−07 | −1.377E−06 | |
| S19 | −4.736E−08 | −3.492E−09 | −6.682E−11 | |
| S20 | −3.058E−08 | −8.441E−10 | −2.178E−11 | |
| S21 | −4.209E−12 | 1.699E−14 | −7.336E−17 | |

1.4 Workings and Effects of Infrared Irradiation Optical System According to First Embodiment Next, workings and effects of the irradiation optical system 3 according to the present embodiment are described. A preferred configuration of the irradiation optical system 3 according to the present embodiment is described together. It is to be noted that the effects described in the present specification are mere examples and are not limited thereto, and may include other effects. The same applies to other embodiments described later.

In the irradiation optical system 3 illustrated in FIG. 16, parallel light of the light from the infrared light source 2 is created by the collimator lens L11. After the basic parallel light beam is created by the collimator lens L11, a first uniform surface is generated by the relay lens L12, the cylindrical lens array L13, the relay lens L14, and the relay lens L15. Thereafter, a second uniform surface is generated by the cylindrical lens array L16, the relay lens L17, and the relay lens L18 to allow the parallel light beam to pass through the mechanical aperture St. The light beam that has passed through the mechanical aperture St further passes through the first irradiation lens L21 and the second irradiation lens L22, which results in generation of the light film 32 at the predetermined height with respect to the visible light projection surface 31.

In the irradiation optical system 3 illustrated in FIG. 16, the lens surfaces other than the surfaces of the collimator lens L11 are all cylindrical surfaces each having refractive power only in the X direction in the drawing. The first irradiation lens L21 and the second irradiation lens L22 each have a function of transferring the light quantity distribution in the vicinity of the mechanical aperture St from the visible light projection surface 31 to the predetermined height while converting the distribution, thus coupling the visible light projection surface 31 to the vicinity of the mechanical aperture St in a conjugate manner. The cylindrical lens array L16, the relay lens L17, and the relay lens L18 form a uniform light beam in the vicinity of the mechanical aperture St. The cylindrical lens array L13, the relay lens L14, and the relay lens L15 are provided in order to bring an image generated in pupil observation close to substantially uniform and to suppress the light beam to a light beam equivalent to class 1 of the laser safety standard.

The first irradiation lens L21 and the second irradiation lens L22 are each configured by two negative cylindrical lenses in combination and have a small focal length, which makes it possible to perform irradiation with light at a wide angle. The second irradiation lens L22 that is closest to irradiation side may be preferably configured by a negative meniscus lens in the X direction and satisfy the following condition. This makes it possible to properly generate a light beam at a wide angle while avoiding total reflection.

$$|Rout| > |Rin| \quad (1)$$

where Rin denotes a curvature radius of a light incident surface of the second irradiation lens L22 in the X direction, and Rout denotes a curvature radius of a light output surface of the second irradiation lens L22 in the X direction.

Further, as for the light incident surface of the second irradiation lens L22 in the X direction, when the following condition is satisfied, it is possible to cope with a case where the projection distance is smaller.

$$\text{Conic constant} < -1$$

FIG. 17 schematically illustrates an action of an aspherical surface of the irradiation lens section 20 in the irradiation optical system illustrated in FIG. 16.

The irradiation lens section 20 may be preferably so configured as to include one or more combinations of first and second light beams that satisfy the following conditions at the height h of 0.8 hmax or larger and 1.0 hmax or smaller when the light incident height to the first irradiation lens L21 is denoted by h and the maximum light incident height is denoted by hmax. It is to be noted that, in the example of FIG. 17, in a region lower than the optical axis, a light beam angle parallel to the optical axis is defined as 0 degree, the lower side of the light beam parallel to the optical axis is defined as plus, and the upper side thereof is defined as minus. In the region lower than the optical axis, the incident angle and the output angle are increased toward the lower side of the light beam parallel to the optical axis.

$$\theta in1 < \theta in2 \quad (2)$$

$$\theta out1 > \theta out2 \quad (3)$$

where $\theta in1$ denotes an incident angle of the first light beam to the first irradiation lens L21, $\theta in2$ denotes an incident angle of the second light beam to the first irradiation lens L21, $\theta out1$ denotes an output angle of the first light beam from the first irradiation lens L21, and $\theta out2$ denotes an output angle of the second light beam from the first irradiation lens L21.

The first irradiation lens L21 is configured as a biconcave lens in the X direction, thereby serving to make up refractive power of the second irradiation lens L22. An inflection point may be preferably included in one of the light incident surface and the light output surface of one of the first irradiation lens L21 and the second irradiation lens L22. The inflection point may preferably satisfy the conditions of the above-described expressions (2) and (3) to cause a phenomenon in which the output angle is inverted from the incident angle, for an off-axis incident light beam having a high light incident height.

FIG. 18 schematically illustrates an example of in-plane distribution of the infrared irradiation light in the irradiation optical system 3 illustrated in FIG. 16. FIG. 13 schematically illustrates an example of the in-plane distribution of the light taken in the visible light projection optical system 8. FIG. 19 schematically illustrates an example of final in-plane distribution of light (the in-plane distribution of the light taken in the infrared imaging device 61) that is a combination of the in-plane distribution of FIG. 13 and the in-plane distribution provided by the irradiation optical system 3 of FIG. 18.

Satisfying the conditions of the above-described expressions (2) and (3) makes it possible to reduce loss of the light quantity, and to irradiate, with a large quantity of light, the region corresponding to an end portion on the visible light projection surface 31, thereby resulting in the in-plane distribution illustrated in FIG. 18. It is to be noted that the conditions of the above-described expressions (2) and (3) are not necessarily essential, but are necessary as the position of the visible light projection surface 31 becomes closer. When the in-plane distribution on the visible light projection optical system 8 side is as illustrated in FIG. 13, it is possible to form the in-plane distribution as illustrated in FIG. 19 in total. As a result, it is possible to uniformize the in-plane distribution as compared with the case where the irradiation optical system 3 is configured by a rod lens.

The irradiation optical system 3 illustrated in FIG. 16 is suitable to be used together with the visible light projection optical system 8 because the irradiation optical system 3 is compatible with the interactive detection technology of LLP system. At this time, the irradiation lens section 20 of the irradiation optical system 3 may preferably form the light film 32 that is substantially parallel to the visible light projection surface 31. In addition, as illustrated in FIG. 7, the thickness of the light film 32 (a width c of the substantially parallel optical flux) in the region 31A corresponding to the visible light projection surface 31 may be smaller than 10 mm. This makes it possible to reduce a spot diameter detected in the LLP system to enhance accuracy.

Further, the relay lens L12 is disposed between the collimator lens L11 and the cylindrical lens array L13 in the configuration example illustrated in FIG. 16; however, the relay lens L12 serves almost no optical role and is provided for preparation for bending an optical path in a configuration illustrated in a second embodiment described later. Therefore, a configuration without the relay lens L12 is also available for downsizing and cost reduction.

Using the irradiation optical system 3 illustrated in FIG. 16 allows for flexible design of irradiation plane (the light film 32) of the LPP system, and makes it possible to form a relatively uniform light-receiving profile even in the case of a projector with use of a particularly ultrashort-focus lens. In addition, the plurality of rod lenses are unnecessary to form the irradiation plane, which makes it possible to reduce the number of components and adjustment processes. Further, using the irradiation optical system 3 illustrated in FIG. 16 allows for a design that maintains class 1 of the laser safety standard.

1.5 Modification Examples

1.5.1 First Modification Example

FIG. 20 illustrates a configuration example of an irradiation optical system according to a first modification example of the present embodiment. Further, Table 4 and Table 5 illustrate specific numerical examples corresponding to the irradiation optical system according to the first modification example illustrated in FIG. 20.

In the first modification example illustrated in FIG. 20, the shapes of two pairs of cylindrical lenses (the surface S18 to the surface S21) of the first irradiation lens L21 and the second irradiation lens L22 are different from those in the configuration example illustrated in FIG. 16. More specifically, the second irradiation lens L22 has a biconcave shape in the X direction. Such a configuration also makes it possible to achieve workings and effects similar to those in the configuration example illustrated in FIG. 16.

TABLE 4

| Surface No. | Type of Surface | R | d | nd | vd |
|---|---|---|---|---|---|
| S0 | — | Infinity | 7.40 | | |
| S1 | Spherical Surface | Infinity | 2.80 | 1.585 | 29.9 |
| S2 | Aspherical Surface | −5.16 | 3.00 | | |
| S3 | Cylindrical Surface | 12.54 | 1.50 | 1.585 | 29.9 |
| S4 | Cylindrical Surface | −12.54 | 0.50 | | |
| S5 | Aspherical Cylindrical Array | 0.357 | 0.95 | 1.544 | 56.6 |
| S6 | Aspherical Cylindrical Array | −0.357 | 0.50 | | |
| S7 | Cylindrical Surface | 12.54 | 1.50 | 1.585 | 29.9 |
| S8 | Cylindrical Surface | −12.54 | 8.22 | | |
| S9 | Cylindrical Surface | 12.54 | 1.50 | 1.585 | 29.9 |
| S10 | Cylindrical Surface | −12.54 | 0.50 | | |
| S11 | Aspherical Cylindrical Array | 0.357 | 0.95 | 1.544 | 56.6 |
| S12 | Aspherical Cylindrical Array | −0.357 | 0.50 | | |
| S13 | Cylindrical Surface | 12.54 | 1.50 | 1.585 | 29.9 |
| S14 | Cylindrical Surface | −12.54 | 8.22 | | |
| S15 | Cylindrical Surface | 12.54 | 1.50 | 1.585 | 29.9 |
| S16 | Cylindrical Surface | −12.54 | 0.50 | | |
| S17 | Spherical Surface | Infinity | 2.00 | | |
| S18 | Aspherical Cylindrical Surface | −2.12 | 1.10 | 1.585 | 29.9 |
| S19 | Aspherical Cylindrical Surface | 4.28 | 3.85 | | |
| S20 | Aspherical Cylindrical Surface | −2.84 | 1.10 | 1.585 | 29.9 |
| S21 | Aspherical Cylindrical | 33.92 | 40.00 | | |

TABLE 4-continued

| Surface No. | Type of Surface | R | d | nd | vd |
|---|---|---|---|---|---|
| S22 | Surface Spherical Surface | Infinity | — | | |

TABLE 5

| Surface No. | k | β4 | β6 | β8 |
|---|---|---|---|---|
| S2 | −0.317 | 2.230E−04 | 5.527E−06 | 1.671E−07 |
| S5 | −1.157 | 0 | 0 | 0 |
| S6 | −1.157 | 0 | 0 | 0 |
| S11 | −1.157 | 0 | 0 | 0 |
| S12 | −1.157 | 0 | 0 | 0 |
| S18 | −2.124 | 0 | 0 | 0 |
| S19 | −8.323 | −1.981E−03 | −2.866E−04 | −3.670E−05 |
| S20 | 0.000 | 1.344E−03 | 2.376E−04 | 4.709E−05 |
| S21 | 0.000 | −7.748E−04 | 6.302E−06 | −4.082E−08 |

| Surface No. | β10 | β12 | β14 | Array Width |
|---|---|---|---|---|
| S2 | 0 | 0 | 0 | — |
| S5 | 0 | 0 | 0 | 0.3 |
| S6 | 0 | 0 | 0 | 0.3 |
| S11 | 0 | 0 | 0 | 0.3 |
| S12 | 0 | 0 | 0 | 0.3 |
| S18 | 0 | 0 | 0 | — |
| S19 | 0.000E+00 | 0.000E+00 | 0.000E+00 | — |
| S20 | −2.933E−05 | 0.000E+00 | 0.000E+00 | — |
| S21 | 4.232E−10 | 1.052E−11 | 8.230E−14 | — |

1.5.2 Second Modification Example

FIG. 21 illustrates a configuration example of an irradiation optical system according to a second modification example of the present embodiment. In addition, Table 6 and Table 7 illustrate specific numerical examples corresponding to the irradiation optical system according to the second modification example illustrated in FIG. 21.

In the second modification example illustrated in FIG. 21, the shapes of two pairs of cylindrical lenses (the surface S18 to the surface S21) of the first irradiation lens L21 and the second irradiation lens L22 are different from those in the configuration example illustrated in FIG. 16. More specifically, the first irradiation lens L21 has the shape of a negative meniscus lens in the X direction. Such a configuration also makes it possible to achieve workings and effects similar to those in the configuration example illustrated in FIG. 16.

In the second modification example illustrated in FIG. 21, the premise of the generation position of the light film 32 is changed. More specifically, the premise is changed to a premise in which the visible light projection surface 31 corresponding to 21 inches is located at a distance of 80 mm from the tip of the irradiation lens section 20, and the light film 32 is generated on the visible light projection surface 31. The position of the light film 32 is aligned to the position of the visible light projection surface 31 projected by the visible light projection optical system 8, and thus such a difference in the generation position of the light film 32 is easily caused by difference in design of the visible light projection optical system 8. In this case, it is appreciated that the lens shape of the irradiation lens section 20 illustrated in FIG. 21 is more moderate than those in the respective configuration examples of FIG. 16 and FIG. 20, because a burden applied to the visible light projection optical system 8 is smaller. The inflection point is provided on the lens surface of the second irradiation lens L22 in the second modification example illustrated in FIG. 21; however, the inflection point may be not provided in actual use because of a narrow angle of view.

TABLE 6

| Surface No. | Type of Surface | R | d | nd | vd |
|---|---|---|---|---|---|
| S0 | — | Infinity | 7.40 | | |
| S1 | Spherical Surface | Infinity | 2.80 | 1.585 | 29.9 |
| S2 | Aspherical Surface | −5.16 | 3.00 | | |
| S3 | Cylindrical Surface | 12.54 | 1.50 | 1.585 | 29.9 |
| S4 | Cylindrical Surface | −12.54 | 0.50 | | |
| S5 | Aspherical Cylindrical Array | 0.357 | 0.95 | 1.544 | 56.6 |
| S6 | Aspherical Cylindrical Array | −0.357 | 0.50 | | |
| S7 | Cylindrical Surface | 12.54 | 1.50 | 1.585 | 29.9 |
| S8 | Cylindrical Surface | −12.54 | 8.22 | | |
| S9 | Cylindrical Surface | 12.54 | 1.50 | 1.585 | 29.9 |
| S10 | Cylindrical Surface | −12.54 | 0.50 | | |
| S11 | Aspherical Cylindrical Array | 0.357 | 0.95 | 1.544 | 56.6 |
| S12 | Aspherical Cylindrical Array | −0.357 | 0.50 | | |
| S13 | Cylindrical Surface | 12.54 | 1.50 | 1.585 | 29.9 |
| S14 | Cylindrical Surface | −12.54 | 8.22 | | |
| S15 | Cylindrical Surface | 12.54 | 1.50 | 1.585 | 29.9 |
| S16 | Cylindrical Surface | −12.54 | 0.50 | | |
| S17 | Spherical Surface | Infinity | 2.00 | | |
| S18 | Aspherical Cylindrical Surface | −1.88 | 1.00 | 1.545 | 55.8 |
| S19 | Aspherical Cylindrical Surface | −12.54 | 5.50 | | |
| S20 | Aspherical Cylindrical Surface | −2.09 | 1.50 | 1.545 | 55.8 |
| S21 | Aspherical Cylindrical Surface | −700.97 | 80.0 | | |
| S22 | Spherical Surface | Infinity | — | | |

TABLE 7

| Surface No. | k | β4 | β6 | β8 |
|---|---|---|---|---|
| S2 | −0.317 | 2.230E−04 | 5.527E−06 | 1.671E−07 |
| S5 | −1.157 | 0 | 0 | 0 |
| S6 | −1.157 | 0 | 0 | 0 |
| S11 | −1.157 | 0 | 0 | 0 |
| S12 | −1.157 | 0 | 0 | 0 |
| S18 | −3.313 | −2.4741E−02 | 9.5889E−04 | −1.6760E−04 |
| S19 | 0.000 | 0 | 0 | 0 |
| S20 | −0.926 | −1.9077E−03 | 4.8626E−05 | 4.5317E−06 |
| S21 | 4441.452 | −2.0327E−04 | 1.8055E−06 | −4.7214E−09 |

| Surface No. | β10 | β12 | β14 | Array Width |
|---|---|---|---|---|
| S2 | 0 | 0 | 0 | — |
| S5 | 0 | 0 | 0 | 0.3 |
| S6 | 0 | 0 | 0 | 0.3 |
| S11 | 0 | 0 | 0 | 0.3 |
| S12 | 0 | 0 | 0 | 0.3 |
| S18 | 0 | 0 | 0 | — |
| S19 | 0 | 0 | 0 | — |
| S20 | 0 | 0 | 0 | — |
| S21 | 0 | 0 | 0 | — |

1.5.3 Other Modification Examples

In the configuration example of the irradiation optical system 3 illustrated in FIG. 16, providing a small margin in the quantity of light entering the mechanical aperture St eliminates adjustment of the lens in the lateral direction. The appropriate margin to be provided is about 10% to about 30% of the light quantity. In contrast, when the margin at this portion is designed to be substantially zero and lens adjustment process is provided, it is possible to increase the light quantity. The configuration is effective for a case where the laser output is insufficient and for a case where the temperature increase is not preferred.

Further, the laser light source may be desirably used as the infrared light source 2. This is because, in the case of using the LED, a radiation angle from the light emitting source is large, thus causing light quantity loss to be increased, which unsuitably increases the supplying power drastically. In terms of a low visual profile, infrared light having a wavelength of 700 nm or larger may be desirably used for the laser light source. Further, infrared light having a wavelength of 820 nm or less may be desirably used in consideration of wavelength characteristics of the polarization separation device 6 on light receiving side. In addition, the polarization direction of the laser light source may be desirably a direction causing P-polarized light with respect to the cylindrical surface, because the P-polarized light is small in transmission loss, in particular, in a wide-angle range.

Moreover, description has been given above of the example in which the ultrashort-focus lens is used in the visible light projection optical system 8 in terms of technical affinity; however, a lens of normal projection distance may be used in the visible light projection optical system 8. Further, in the configuration example illustrated in FIG. 7, the visible light projection optical system 8 is configured as a coaxial detection system in which the projection lens also functions as the detection lens for the infrared light because the visible light projection surface 31 is extremely close in the case of using the ultrashort-focus lens. The projection lens and the detection lens for the infrared light, however, may be configured separately.

Moreover, in the case where the second irradiation lens L22 is made of plastic in the irradiation optical system 3, wear resistance is not high; however, a flat plate parallel to the tip portion of the second irradiation lens L22 is provided to take measures against the low wear resistance. Moreover, as a device to be provided at the tip portion, a cylindrical arch-shaped optical device that has incident curvature substantially equal to output curvature may be used without any disadvantage. A device that has an elliptical shape or other shapes but has a substantially constant thickness may be used without any disadvantage; however, maintaining the P polarization direction to some extent is advantageous. Alternatively, adopting hard coating makes it possible to improve the wear resistance itself.

In addition, in the above description, description has been given of the example in which the irradiation lens section 20 includes the first irradiation lens L21 and the second irradiation lens L22 each configured by a negative cylindrical lens; however, the irradiation lens section 20 may further include other lenses. For example, the irradiation lens section 20 may include a cylindrical lens that has positive refractive power in a predetermined direction (in the X direction). In this case, for example, the irradiation lens section 20 may have a positive-negative-negative three-lens configuration in which a positive cylindrical lens, a first negative cylindrical lens, and a second negative cylindrical lens are disposed in order from the infrared light source 2. Moreover, for example, the irradiation lens section 20 may have a negative-positive-negative three-lens configuration in which the first negative cylindrical lens, the positive cylindrical lens, and the second negative cylindrical lens are disposed in order from the infrared light source 2.

2. Second Embodiment

Next, a second embodiment of the disclosure is described. In the following, description of portions having configurations and workings similar to those of the foregoing first embodiment is omitted where appropriate.

FIG. 22 illustrates a configuration example of the irradiation optical system 3 according to the second embodiment. The irradiation optical system 3 according to the present embodiment is largely different in the configuration of the uniformizing section 10 from the configuration example of the irradiation optical system 3 illustrated in FIG. 16.

In the present embodiment, the uniformizing section 10 is configured as a bending optical system to reduce the entire length and the number of components. More specifically, a polarization separation device 11, a λ/4 plate 12, and a mirror 13 are added to the configuration example of the irradiation optical system 3 illustrated in FIG. 16 to configure the bending optical system, and the relay lens L15, the cylindrical lens array L16, and the relay lens L17 are removed from the configuration of the irradiation optical system 3 illustrated in FIG. 16. As the polarization separation device 11, any of a polarization beam splitter and a wire grid may be used. The mirror 13 is a planar mirror.

In the present embodiment, the infrared light source 2 and the collimator lens L11 are disposed in a first direction, with respect to the polarization separation device 11. The relay lens L12, the cylindrical lens array L13, the relay lens L14, the λ/4 plate 12, and the mirror 13 are disposed in a second direction (in an optical path of the light emitted from the infrared light source 2 and bent by the polarization separation device 11). The relay lens L18 and the irradiation lens section 20 are disposed in a third direction (on side opposite to the second direction with respect to the polarization separation device 11).

The polarization separation device 11 reflects light of a first polarization component (for example, S polarization component) out of the light emitted from the infrared light source 2, toward the direction in which components such as the cylindrical lens array L13 and the mirror 13 are disposed. In addition, the polarization separation device 11 outputs light of a second polarization component (for example, a P polarization component) out of the light that has been reflected by the mirror 13 and entered components such as the cylindrical lens L13 again, toward the irradiation lens section 20. The λ/4 plate 12 is provided for conversion of the first polarization component between the second polarization component.

In the present embodiment, the optical path is substantially equivalent to that in the irradiation optical system 3 illustrated in FIG. 16, and specific numerical examples are also equivalent to those in Table 2 and Table 3 described above. The polarization separation device 11 is disposed between the surface S2 and the surface S3, the mirror 13 is placed at a middle point between the surface S8 and the surface S9, and the surface S3 to the surface S8 are equal to the surface S14 to the surface S9.

It is to be noted that the incident angle of the infrared light source 2 and the incident angle of the collimator lens L11 are both 90 degrees with respect to the axis in the final irradiation direction in FIG. 22; however, the incident angles may be preferably shallow so as to be close to the axis of the final irradiation direction in terms of influence of the incident angle of the polarization separation device 11. Alternatively, forming the polarization separation device 11 into a cube shape instead of the plate shape makes it possible to reduce the influence of the incident angle. In this case, placement of 90 degrees may be preferable.

3. Third Embodiment

Next, a third embodiment of the disclosure is described. In the following, description of portions having configurations and workings similar to those of the foregoing first embodiment or the foregoing second embodiment is omitted where appropriate.

3.1 Configuration

FIG. 23 illustrates a configuration example of the irradiation optical system 3 according to the third embodiment. In addition, Table 8 and Table 9 illustrate specific numerical examples corresponding to the irradiation optical system 3 according to the present embodiment illustrated in FIG. 23.

The irradiation optical system 3 according to the present embodiment is largely different in the configuration of the uniformizing section 10 from the configuration example of the irradiation optical system 3 illustrated in FIG. 16. The five relay lenses L12, L14, L15, L17, and L18 are used in the uniformizing section 10 of the irradiation optical system 3 illustrated in FIG. 16, whereas two relay lenses L14A and L17A are provided in place of the five relay lenses L12, L14, L15, L17, and L18, in the present embodiment. This makes it possible to reduce material cost. The relay lens L14A is disposed between the cylindrical lens array L13 and the cylindrical lens array L16. The relay lens L17A is disposed between the cylindrical lens array L16 and the mechanical aperture St.

TABLE 8

| Surface No. | Type of Surface | R | d | nd | vd |
|---|---|---|---|---|---|
| S0 | — | Infinity | 7.40 | | |
| S1 | Spherical Surface | Infinity | 2.80 | 1.585 | 29.9 |
| S2 | Aspherical Surface | −5.16 | 3.00 | | |
| S3 | Aspherical Cylindrical Array | 0.357 | 0.95 | 1.544 | 56.6 |
| S4 | Aspherical Cylindrical Array | −0.357 | 8.90 | | |
| S5 | Aspherical Cylindrical Surface | 10.30 | 3.00 | 1.585 | 29.9 |
| S6 | Aspherical Cylindrical Surface | −10.30 | 8.50 | | |
| S7 | Aspherical Cylindrical Array | 0.357 | 0.95 | 1.544 | 56.6 |
| S8 | Aspherical Cylindrical Array | −0.357 | 8.90 | | |
| S9 | Aspherical Cylindrical Surface | 10.30 | 3.00 | 1.585 | 29.9 |
| S10 | Aspherical Cylindrical Surface | −10.30 | 8.50 | | |
| S11 | Spherical Surface | Infinity | 2.00 | | |
| S12 | Aspherical Cylindrical Surface | −1.97 | 1.00 | 1.531 | 56.0 |
| S13 | Aspherical Cylindrical Surface | 7.24 | 7.40 | | |
| S14 | Aspherical Cylindrical Surface | −3.77 | 1.50 | 1.531 | 56.0 |
| S15 | Aspherical Cylindrical Surface | −63.94 | 40.00 | | |
| S16 | Spherical Surface | Infinity | — | | |

TABLE 9

| Surface No. | k | β4 | β6 | β8 |
|---|---|---|---|---|
| S2 | −0.317 | 2.230E−04 | 5.527E−06 | 1.67E−07 |
| S3 | −1.157 | 0 | 0 | 0 |
| S4 | −1.157 | 0 | 0 | 0 |
| S5 | −2.500 | 0 | 0 | 0 |
| S6 | −2.500 | 0 | 0 | 0 |
| S7 | −1.157 | 0 | 0 | 0 |
| S8 | −1.157 | 0 | 0 | 0 |
| S9 | −2.500 | 0 | 0 | 0 |
| S10 | −2.500 | 0 | 0 | 0 |
| S12 | −0.765 | 9.693E−03 | 4.791E−04 | 3.345E−04 |
| S13 | 1.536 | 2.945E−03 | −6.379E−05 | −1.972E−05 |
| S14 | −1.147 | −2.129E−03 | 1.730E−05 | −1.522E−06 |
| S15 | 6.396 | −7.267E−05 | 7.590E−07 | −2.404E−09 |

| Surface No. | β10 | β12 | β14 | Array Width |
|---|---|---|---|---|
| S2 | 0 | 0 | 0 | — |
| S3 | 0 | 0 | 0 | 0.3 |
| S4 | 0 | 0 | 0 | 0.3 |
| S5 | 0 | 0 | 0 | — |
| S6 | 0 | 0 | 0 | — |
| S7 | 0 | 0 | 0 | 0.3 |
| S8 | 0 | 0 | 0 | 0.3 |
| S9 | 0 | 0 | 0 | — |
| S10 | 0 | 0 | 0 | — |
| S12 | −3.896E−06 | −7.760E−07 | −1.377E−06 | — |
| S13 | −4.736E−08 | −3.492E−09 | −6.682E−11 | — |
| S14 | −3.058E−08 | −8.441E−10 | −2.178E−11 | — |
| S15 | −4.209E−12 | 1.699E−14 | −7.336E−17 | — |

3.2 Modification Examples

FIG. 24 illustrates a configuration example of the irradiation optical system 3 according to a modification example of the present embodiment. In a case where the light quantity is relatively insufficient, it is possible to cause the light beam to enter from two directions, thereby achieving in-plane uniformization. More specifically, as illustrated in FIG. 24, two series of uniformizing sections 10A and 10B may be provided as the uniformizing section 10. The configuration of each of the uniformizing sections 10A and 10B may be substantially similar to the configuration of FIG. 23.

4. Fourth Embodiment

Next, a fourth embodiment of the disclosure is described. In the following, description of portions having configurations and workings similar to those of the foregoing first to third embodiments is omitted where appropriate.

FIG. 25 illustrates a configuration example of the irradiation optical system 3 according to the fourth embodiment. In addition, Table 10 and Table 11 illustrate specific numerical examples corresponding to the irradiation optical system 3 according to the present embodiment illustrated in FIG. 25.

The irradiation optical system 3 according to the present embodiment is largely different in the configuration of the uniformizing section 10 from the configuration example of the irradiation optical system 3 illustrated in FIG. 16. The two cylindrical lens arrays L13 and L16 are used in the configuration example of the irradiation optical system 3 illustrated in FIG. 16 in order to suppress the light beam within the class 1 of the laser safety standard; however, a combination of one cylindrical lens array L16 and a diffuser plate or a combination of one cylindrical lens array L16 and a diffractive device 14 may be used as illustrated in FIG. 25.

In the case of using the diffuser plate, it is desirable to suppress the diffusion angle in the vertical direction to be equal to or smaller than 0.2 degrees, if possible, equal to or smaller than 0.1 degrees in order to suppress spreading of the light beam in the height direction (the Y direction). This is because reducing a diameter of the light beam suppresses detection failure. In addition, the position of the collimator lens L11 may be desirably determined such that the light flux on the visible light projection surface 31 slightly converges. This makes it possible to reduce influence that increases the diameter of the light beam.

In this configuration, the cylindrical lens array L13 and the relay lens L14A are removed and one of the diffuser plate and the diffractive device 14 is disposed immediately in front of the mechanical aperture St in the configuration example illustrated in FIG. 23. This allows for expectation of an effect of relaxing the safety standard. It is to be noted that, although Table 10 and Table 11 each illustrate a configuration based on the configuration example illustrated in FIG. 23, Table 8, and Table 9, a configuration based on the configuration example illustrated in, for example, FIG. 16, Table 2, and Table 3 may be used.

TABLE 10

| Surface No. | Type of Surface | R | d | nd | νd |
|---|---|---|---|---|---|
| S0 | — | Infinity | 7.40 | | |
| S1 | Spherical Surface | Infinity | 2.80 | 1.585 | 29.9 |
| S2 | Aspherical Surface | −5.16 | 3.00 | | |
| S3 | Aspherical Cylindrical Array | 0.357 | 0.95 | 1.544 | 56.6 |
| S4 | Aspherical Cylindrical Array | −0.357 | 8.90 | | |
| S5 | Aspherical Cylindrical Surface | 10.30 | 3.00 | 1.585 | 29.9 |
| S6 | Aspherical Cylindrical Surface | −10.30 | 7.50 | | |
| S7 | Spherical Surface | Infinity | 1.00 | | |
| S8 | Spherical Diffusion Surface | Infinity | 0.00 | | |
| S9 | Spherical Surface | Infinity | 2.00 | | |
| S10 | Aspherical Cylindrical Surface | −1.97 | 1.00 | 1.531 | 56.0 |
| S11 | Aspherical Cylindrical Surface | 7.24 | 7.40 | | |
| S12 | Aspherical Cylindrical Surface | −3.77 | 1.50 | 1.531 | 56.0 |
| S13 | Aspherical Cylindrical Surface | −63.94 | 40.00 | | |
| S14 | Spherical Surface | Infinity | — | | |

TABLE 11

| Surface No. | k | β4 | β6 | β8 |
|---|---|---|---|---|
| S2 | −0.317 | 2.230E−04 | 5.527E−06 | 1.671E−07 |
| S3 | −1.157 | 0 | 0 | 0 |
| S4 | −1.157 | 0 | 0 | 0 |
| S5 | −2.500 | 0 | 0 | 0 |
| S6 | −2.500 | 0 | 0 | 0 |
| S10 | −0.765 | 9.693E−03 | 4.791E−04 | 3.345E−04 |
| S11 | 1.536 | 2.945E−03 | −6.379E−05 | −1.972E−05 |
| S12 | −1.147 | −2.129E−03 | 1.730E−05 | −1.522E−06 |
| S13 | 6.396 | −7.267E−05 | 7.590E−07 | −2.404E−09 |

| Surface No. | β10 | β12 | β14 | Array Width |
|---|---|---|---|---|
| S2 | 0 | 0 | 0 | — |
| S3 | 0 | 0 | 0 | 0.3 |
| S4 | 0 | 0 | 0 | 0.3 |

TABLE 11-continued

| | | | | |
|---|---|---|---|---|
| S5  | 0         | 0          | 0          | — |
| S6  | 0         | 0          | 0          | — |
| S10 | −3.896E−06 | −7.760E−07 | −1.377E−06 | — |
| S11 | −4.736E−08 | −3.492E−09 | −6.682E−11 | — |
| S12 | −3.058E−08 | −8.441E−10 | −2.178E−11 | — |
| S13 | −4.209E−12 |  1.699E−14 | −7.336E−17 | — |

5. Other Embodiments

The technology of the disclosure is not limited to the description of the foregoing respective embodiments and may be modified in a wide variety of ways.

In the disclosure, "uniformization" by the uniformizing section 10 does not necessarily uniformize the in-plane distribution of the light from the infrared light source 2 completely. For example, nonuniformity may be absorbed through design of the irradiation lens section 2 to some extent when the uniformizing level is improved from the profile at the laser light emission by the infrared light source 2. For example, a configuration may also be considered in which a light pipe not having a sufficient length is used as the uniformizing section 10. Alternatively, in the foregoing first embodiment, even in the case where the lens array pitches of the respective cylindrical lens arrays L13 and L16 are insufficient and the uniformized surface is not sufficiently uniform, the nonuniformity may be absorbed through design of the irradiation lens section 20 when the uniformizing level is improved to some extent.

Further, the technology may also have the following configurations.

(1)

An irradiation optical system, including:

a uniformizing section that brings in-plane distribution of light emitted from a light source, close to uniform in-plane distribution; and an irradiation lens section that diffuses the light in a predetermined direction, the light having the in-plane distribution brought close to the uniform in-plane distribution by the uniformizing section, the irradiation lens section including, in order from the light source, a first cylindrical lens and a second cylindrical lens each having negative refractive power in the predetermined direction.

(2)

The irradiation optical system according to (1), in which the second cylindrical lens includes a light incident surface and a light output surface, and satisfies a following condition, $$|Rout| > |Rin| \quad (1)$$

where Rin denotes a curvature radius of the light incident surface in the predetermined direction, and Rout denotes a curvature radius of the light output surface in the predetermined direction.

(3)

The irradiation optical system according to (1) or (2), in which when a light incident height to the first cylindrical lens is denoted by h and a maximum light incident height is denoted by hmax, the irradiation lens section is configured to include one or more combinations of a first light beam and a second light beam that satisfy a following condition at the height h of 0.8 hmax or larger and 1.0 hmax or smaller, $$\theta in1 < \theta in2 \quad (2)$$

$$\theta out1 > \theta out2 \quad (3)$$

where θin1 denotes an incident angle of the first light beam to the first cylindrical lens, θin2 denotes an incident angle of the second light beam to the first cylindrical lens, θout1 denotes an output angle of the first light beam from the first cylindrical lens, and θout2 denotes an output angle of the second light beam from the first cylindrical lens.

(4)

The irradiation optical system according to any one of (1) to (3), in which an inflection point is provided on one of a light incident surface and a light output surface of one of the first cylindrical lens and the second cylindrical lens.

(5)

The irradiation optical system according to any one of (1) to (4), in which the irradiation optical system is used together with a visible light projection optical system that projects an image on a visible light projection surface, and the irradiation lens section forms a light film that is substantially parallel to the visible light projection surface.

(6)

The irradiation optical system according to (5), in which the light film has a thickness less than 10 mm in a region corresponding to the visible light projection surface.

(7)

The irradiation optical system according to any one of (1) to (6), in which the light source includes a laser light source.

(8)

The irradiation optical system according to any one of (1) to (7), in which the light source includes an infrared light source that emits infrared light having a wavelength of 700 nm or larger.

(9)

The irradiation optical system according to any one of (1) to (8), in which the uniformizing section includes two cylindrical lens arrays.

(10)

The irradiation optical system according to any one of (1) to (8), in which the uniformizing section includes a cylindrical lens array and a polarization separation device.

(11)

The irradiation optical system according to (10), in which the uniformizing section further includes a mirror, the light source is disposed in a first direction, the cylindrical lens array and the mirror are disposed in a second direction, and the irradiation lens section is disposed in a third direction, with respect to the polarization separation device, and the polarization separation device reflects light of a first polarization component out of the light emitted from the light source, toward the cylindrical lens array and the mirror, and outputs, toward the irradiation lens section, light of a second polarization component out of light that has been reflected by the mirror and entered the cylindrical lens again.

(12)

A projector provided with a visible light projection optical system that projects an image on a visible light projection surface, and an irradiation optical system that forms a light film substantially parallel to the visible light projection surface, the irradiation optical system including:

a uniformizing section that brings in-plane distribution of light emitted from a light source, close to uniform in-plane distribution; and an irradiation lens section that diffuses the light in a predetermined direction, the light having the in-plane distribution brought close to the uniform in-plane distribution by the uniformizing section, the irradiation lens section including, in order from the light source, a first cylindrical lens and a second cylindrical lens each having negative refractive power in the predetermined direction.

This application is based upon and claims the benefit of priority of the Japanese Patent Application No. 2015-021020 filed with the Japan Patent Office on Feb. 5, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An optical system, comprising:
    a uniformizing section that includes two cylindrical lens arrays; and
    a lens section that diffuses the light in a predetermined direction, the light having an in-plane distribution brought close to a uniform in-plane distribution by the uniformizing section.

2. The optical system according to claim 1, wherein the lens section includes, in order from a light source, a first cylindrical lens and a second cylindrical lens each having negative refractive power in the predetermined direction.

3. The optical system according to claim 2, wherein the second cylindrical lens includes a light incident surface and a light output surface, and satisfies a following condition, $$|Rout| > |Rin| \quad (1)$$

where Rin denotes a curvature radius of the light incident surface in the predetermined direction, and Rout denotes a curvature radius of the light output surface in the predetermined direction.

4. The optical system according to claim 2, wherein when a light incident height to the first cylindrical lens is denoted by h and a maximum light incident height is denoted by hmax, the lens section is configured to include one or more combinations of a first light beam and a second light beam that satisfy a following condition at the height h of 0.8 hmax or larger and 1.0 hmax or smaller, $$\theta in1 < \theta in2 \quad (2)$$

$$\theta out1 > \theta out2 \quad (3)$$

where $\theta in1$ denotes an incident angle of the first light beam to the first cylindrical lens, $\theta in2$ denotes an incident angle of the second light beam to the first cylindrical lens, $\theta out1$ denotes an output angle of the first light beam from the first cylindrical lens, and $\theta out2$ denotes an output angle of the second light beam from the first cylindrical lens.

5. The optical system according to claim 2, wherein an inflection point is provided on one of a light incident surface and a light output surface of one of the first cylindrical lens and the second cylindrical lens.

6. The optical system according to claim 1, wherein
    the optical system is used together with a visible light projection optical system that projects an image on a visible light projection surface, and
    the lens section forms a light film that is substantially parallel to the visible light projection surface.

7. The optical system according to claim 6, wherein the light film has a thickness less than 10 mm in a region corresponding to the visible light projection surface.

8. The optical system according to claim 1, wherein a light source comprises a laser light source.

9. The optical system according to claim 1, wherein a light source comprises an infrared light source that emits infrared light having a wavelength of 700 nm or larger.

10. The optical system according to claim 1, wherein the uniformizing section brings the in-plane distribution of light emitted from a light source, close to the uniform in-plane distribution.

11. The optical system according to claim 1, wherein the uniformizing section includes a cylindrical lens array and a polarization separation device.

12. The optical system according to claim 11, wherein
    the uniformizing section further includes a mirror,
    a light source is disposed in a first direction, the cylindrical lens array and the mirror are disposed in a second direction, and the lens section is disposed in a third direction, with respect to the polarization separation device, and
    the polarization separation device reflects light of a first polarization component out of the light emitted from the light source, toward the cylindrical lens array and the mirror, and outputs, toward the lens section, light of a second polarization component out of light that has been reflected by the mirror and entered the cylindrical lens array again.

13. A projector comprising:
    an optical section that forms a light film substantially parallel to a visible light projection surface;
    a uniformizing section that includes two cylindrical lens arrays; and
    a lens section that diffuses the light in a predetermined direction, the light having an in-plane distribution brought close to a uniform in-plane distribution by the uniformizing section.

14. The projector according to claim 13, wherein the lens section includes, in order from a light source, a first cylindrical lens and a second cylindrical lens each having negative refractive power in the predetermined direction.

15. The projector according to claim 13, wherein
    the optical system is used together with a visible light projection optical system that projects an image on the visible light projection surface, and
    the lens section forms a light film that is substantially parallel to the visible light projection surface.

16. The projector according to claim 15, wherein the light film has a thickness less than 10 mm in a region corresponding to the visible light projection surface.

17. The projector according to claim 13, wherein a light source comprises a laser light source.

18. The projector according to claim 13, wherein a light source comprises an infrared light source that emits infrared light having a wavelength of 700 nm or larger.

19. The projector according to claim 13, wherein the uniformizing section brings the in-plane distribution of light emitted from a light source, close to the uniform in-plane distribution.

20. The projector according to claim 13, wherein the uniformizing section includes a cylindrical lens array and a polarization separation device.

* * * * *